United States Patent [19]
Nagai et al.

[11] Patent Number: 5,691,620
[45] Date of Patent: Nov. 25, 1997

[54] BATTERY CHARGING METHOD

[75] Inventors: Tamiji Nagai; Hitoshi Akiho, both of Kanagawa, Japan

[73] Assignee: Sony Corporation, Tokyo, Japan

[21] Appl. No.: 762,300

[22] Filed: Dec. 10, 1996

Related U.S. Application Data

[63] Continuation of Ser. No. 306,604, Sep. 15, 1994, abandoned.

[30] Foreign Application Priority Data

Sep. 17, 1993 [JP] Japan ................. 5-231171

[51] Int. Cl.⁶ .................. H01M 7/00; H01M 10/44
[52] U.S. Cl. .................. 320/15; 320/39; 320/22; 320/32
[58] Field of Search .................. 320/2, 4, 14, 15, 320/23, 21, 31, 35, 36, 48; 324/433

[56] References Cited

U.S. PATENT DOCUMENTS

| | | | |
|---|---|---|---|
| 5,017,856 | 5/1991 | Johnson, Jr. | 320/2 |
| 5,164,652 | 11/1992 | Johnson et al. | 320/2 |
| 5,237,259 | 8/1993 | Sanpei | 320/23 |
| 5,449,998 | 9/1995 | Melnikov et al. | 320/48 |
| 5,459,671 | 10/1995 | Duley | 364/483 |
| 5,477,125 | 12/1995 | Ettel et al. | 320/20 |
| 5,489,835 | 2/1996 | Stephens et al. | 320/15 |
| 5,493,196 | 2/1996 | Feldstein | 320/3 |
| 5,510,690 | 4/1996 | Tanaka et al. | 320/2 |
| 5,576,608 | 11/1996 | Nagai et al. | 320/22 |

*Primary Examiner*—Edward Tso
*Assistant Examiner*—Gregory J. Toatley, Jr.
*Attorney, Agent, or Firm*—Hill, Steadman & Simpson

[57] ABSTRACT

A voltage at the time of full charging of a battery being charged is set to be larger for a lithium ion battery than for a nickel cadmium battery. Charging of the battery is then carried out using a constant current circuit and a fixed voltage circuit. If the item being charged is a lithium ion battery, a current detection circuit detects when the charging current is less than a prescribed value, a control circuit switches off a switch and the charging is halted. If the item being charged is a nickel cadmium battery, a $-\Delta V$ detection circuit detects when the terminal voltage for the battery becomes low ($-\Delta V$) and the charging is halted. Different types of batteries of the same shape can therefore be charged in the same charging equipment while damage to the batteries during the charging operation is prevented.

25 Claims, 26 Drawing Sheets

$\Delta I_{11} > \Delta I_{21}$
$I_1 > I_2$

BATTERY CHARGING METHOD

This is a continuation of application Ser. No. 08/306,604, filed Sep. 15, 1994 now abandoned.

BACKGROUND OF THE INVENTION

1. Field of the Invention

The present invention relates to a battery charging method suitable for use with batteries which are used with, for example, cameras and a video tape recorders which are formed together as a single item.

2. Description of the Related Art

Comparatively small batteries have to be used with cameras and a video tape recorders which are formed together as a single item so as their portability is maintained. Secondary batteries which can be recharged are therefore used as these batteries.

The charging method for these secondary batteries differs depending on their type. For example, a constant current circuit and a fixed voltage circuit are used for charging lithium ion batteries. On the other hand, constant current circuits are used for charging nickel cadmium batteries. Fixed current circuits are used until completion when charging lithium ion batteries, whilst fixed voltage circuits are used until completion when charging nickel cadmium batteries. If the charging time then becomes long, the detection of full charging becomes difficult. In the worst case there is the danger that a battery may break down. Therefore, in the related art, methods have been evolved where the type of battery is determined and charging is then carried out in accordance with the battery type.

One way of determining the battery type is to change the shape of the lithium batteries and the nickel cadmium batteries. There are also methods where electrodes are set up and the type of battery is determined using these electrodes.

However, if the battery shape is adapted depending on the type of the battery, the battery has to be large. Also, the charging equipment has to be prepared for each different kind of battery, which is expensive. Further, in methods which use detection electrodes, it is difficult to determine the type of the battery if connections with the electrodes are unsatisfactory.

Therefore, as the present invention sets out to resolve the aforementioned problems, it purpose is to put forward a single charging apparatus in which differing types of batteries can be reliably charged.

SUMMARY OF THE INVENTION

In the battery charging method for the present invention, the same charging equipment is used to charge a first type of battery and a second type of battery, in such a manner that the terminal voltage for the first type of battery when fully charged is larger than the terminal voltage for the second type of battery when fully charged.

A lithium ion battery may be used as the first type of battery and a nickel-cadmium battery may be used as the second type of battery.

The types of the first and second batteries are detected and the first type of battery and the second type of battery are charged using different methods in accordance with the detection result.

The first and second types of batteries are charged using a fixed voltage circuit and a constant current circuit and the types of the first and second batteries are determined using the magnitudes of the terminal voltages after the terminal voltages for the batteries have exceeded a prescribed standard value.

Alternatively, the first and second types of batteries may be charged using a fixed voltage circuit and a constant current circuit and the types of the first and second batteries may be determined using the sizes of the terminal currents after the terminal currents for the batteries have fallen below a prescribed standard value.

Also, the first and second types of batteries may be charged for a predetermined period of time by a fixed voltage circuit and a constant current circuit and the types of the first and second batteries may be determined by using at least one of the magnitudes of the terminal voltages for the batteries or the magnitudes of the charging currents for the batteries.

Further, the first and second types of batteries may be charged using a constant current circuit and the types of the first and second batteries may be determined using the rate of change of the terminal voltages after the terminal voltages for the batteries have exceeded a prescribed standard value.

When a battery has been determined to be the first type of battery, charging of the first type of battery is carried out using a fixed voltage circuit and a constant current circuit, and when the battery has been determined to be the second kind of battery, charging of the second type of battery is carried out using a constant current circuit.

Full charging of the first type of battery may be detected as a result of its charging current having become sufficiently small.

The full charging of the second type of battery may be detected as a result of its terminal voltage having fallen.

The full charging of the batteries may also be detected both as a result of the charging current for the batteries having reduced sufficiently and as a result of the terminal voltages for the batteries having become small.

In the battery charging method having the above construction, the terminal voltage for the first type of battery at the time of full charging is set beforehand to be a higher value than the terminal voltage for the second type of battery at the time of full charging. It is then possible to use the same charging equipment to reliably charge both of the batteries without causing damage.

DETAILED DESCRIPTION OF THE PREFERRED EMBODIMENTS

First Embodiment

Figure 1A:
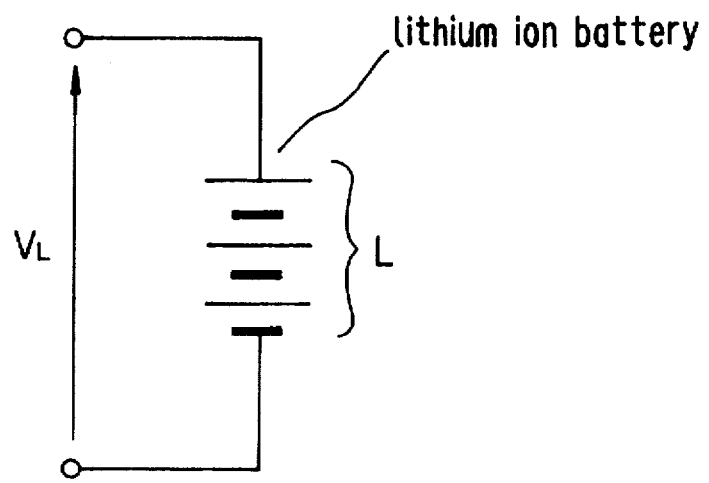
FIGS. 1A and 1B are a view of the structures of the batteries for the present invention.
Figure 1B:
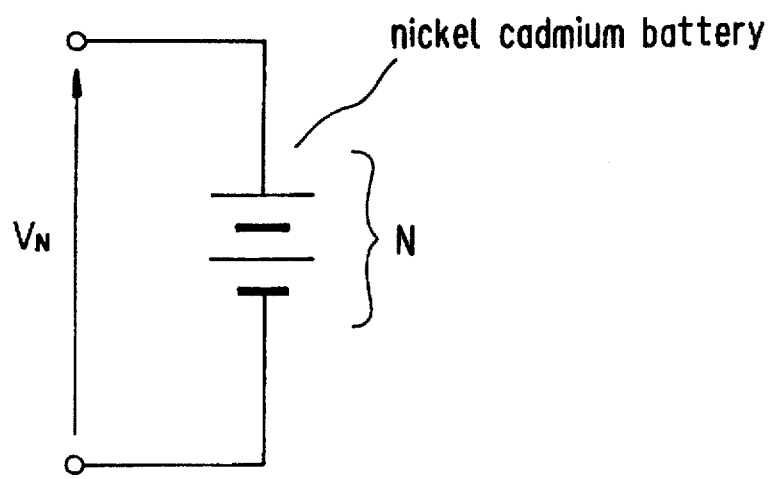

FIGS. 1A and 1B show the relationship between the different types of batteries charged by the battery charging method for the present invention. FIG. 1(a) shows the lithium ion battery 1L which consists of "L" cells and has a terminal voltage $V_L$ when fully charged. This lithium ion battery 1L includes a lithium battery, a lithium ion battery and a lead battery etc.

FIG. 1(b) shows the structure of a nickel cadmium battery 1N which is made up of a combination of N cells and has a terminal voltage $V_N$. This nickel cadmium battery 1N includes a nickel cadmium battery and a nickel hydrogen battery etc.

These batteries 1L and 1N are made to be completely the same shape so that the batteries 1 (1L, 1N) can be charged using the same charging equipment.

Figure 2:
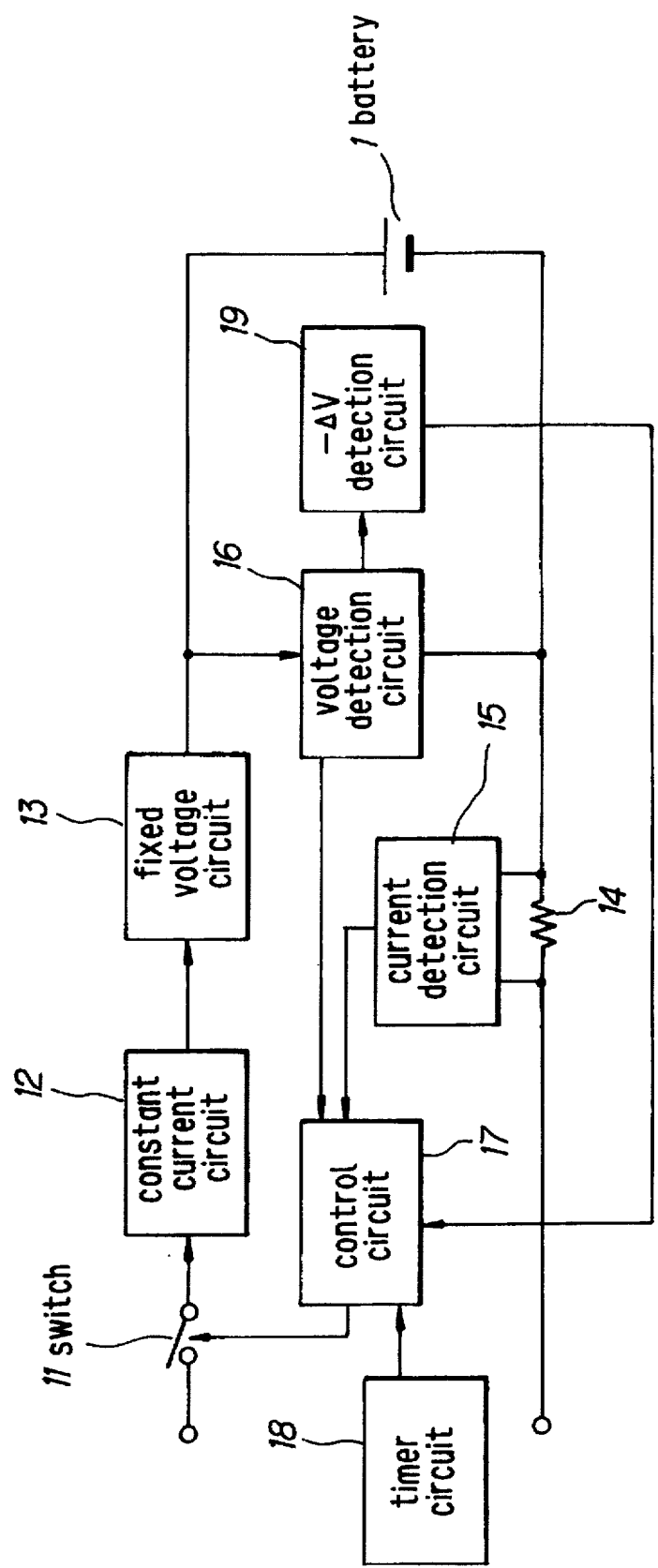
FIG. 2 is a block view showing the structure of a first embodiment of charging equipment suitable for use with a battery charging method for this invention.

FIG. 2 is a view showing an example of the structure of the charging equipment for charging the batteries L1 and L2 shown in FIG. 1. In this embodiment, the prescribed electrical power is supplied to a constant current circuit 12 and a fixed voltage circuit 13 via a switch 11. The battery 1 (1L, 1N), which it is intended to charge, is connected to the constant current circuit 12 and the fixed voltage circuit 13, and a charging detection resistor 14 is then connected in series with this battery 1. A current detection circuit 15 detects the current flowing through the resistance 14 from the voltage across the terminals of this resistance 14 and this is then outputted to a control circuit 17. This control circuit 17 is, for example, made up from a microcomputer etc. A timer circuit 18 is always keeping track of time and outputs this time information to the control circuit 17. The control circuit 17 switches switch 11 on when charging starts and off when charging finishes.

A voltage detection circuit 16 is connected in parallel with the battery 1. This voltage detection circuit 16 detects the terminal voltage or the charging voltage of the battery 1 and outputs the result of this detection to the control circuit 17 and a $-\Delta V$ detection circuit 19. The $-\Delta V$ detection circuit 19 then detects the reduction in the terminal voltage of the battery 1N ($-\Delta V$) and outputs the detection result to the control circuit 17.

This operation will now be described with reference to graphs of the characteristics shown in FIG. 3 and FIG. 4. When the command is given to start the charging operation, the control circuit 17 turns the switch 11 on. The result of this is that the charging operation starts via the constant current circuit 12 and the fixed voltage circuit 13. At this time, the charging current flows from the switch 11, to the constant current circuit 12, on to the fixed voltage circuit 13, to the battery 1, and then on to the resistance 14.

Figure 3:
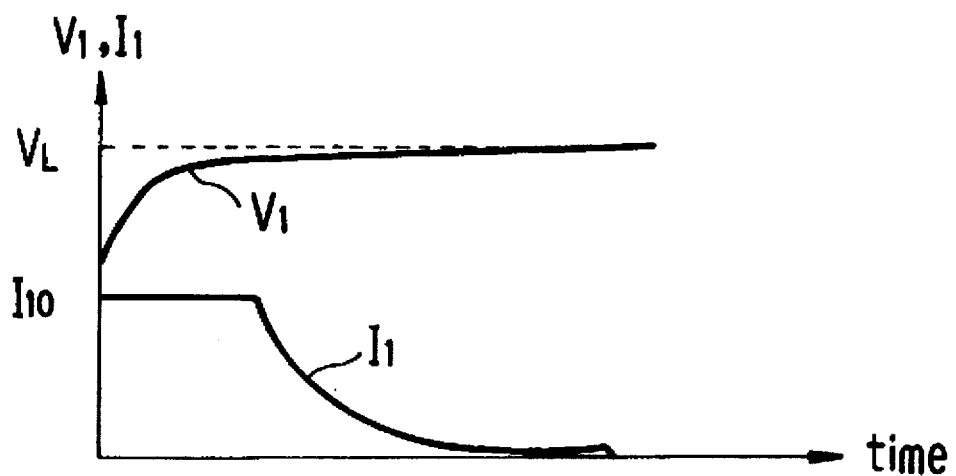
FIG. 3 is a view showing the charging characteristics for a lithium ion battery.

When the battery 1 being charged is a lithium ion battery 1L, the charging operation is generally carried out in accordance with the characteristics shown in FIG. 3. Initially, the fixed voltage circuit 13 is practically not in operation because the internal impedance of the battery 1L is low. The battery 1L is therefore charged by a constant current $I_{10}$ from the constant current circuit 12. However, the internal impedance of the battery 1L increases as the battery 1L is gradually charged and there is therefore an abrupt drop in the charging current $I_1$ flowing through the battery 1L. Now, the constant current circuit 12 is practically not functioning and the fixed voltage circuit 13 is functioning. From thereafter the battery 1L is charged by a fixed voltage from the fixed voltage circuit 13.

The charging current $I_1$ for the battery 1 gradually gets smaller as the fixed voltage charging progresses. The charging current $I_1$ flowing through the resistance 14 is detected by the charging detection circuit 15 so that when this charging current $I_1$ becomes lower than a prescribed standard value decided beforehand, the control circuit 17 switches the switch 11 off and the charging operation is halted.

Alternatively, charging may be carried out continuously from the time when the charging current falls below a prescribed standard value set beforehand for a prescribed period of time, also set beforehand. When the timer circuit 18 then sees that this prescribed period of time has passed, the control circuit 17 turns off the switch 11 and the charging is stopped.

By doing the above, the terminal voltage for the battery 1L becomes the voltage $V_L$ occurring at the time of full charging.

Figure 4:
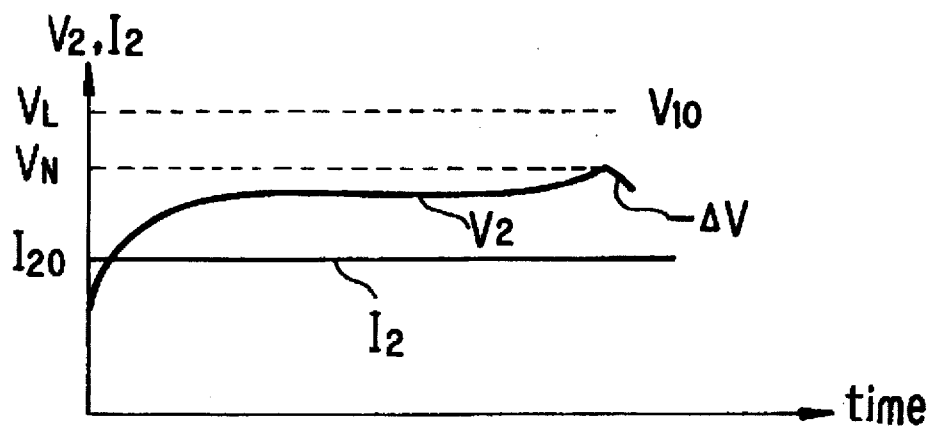
FIG. 4 is a view showing the charging characteristics for a nickel cadmium battery.

On the other hand, when the battery 1 connected is a nickel cadmium battery 1N, the charging is carried out using the constant current $I_{20}$ from the constant current circuit 12 in the way shown in FIG. 4. The value for this constant current $I_{20}$ is approximately the same as that for the constant current $I_{10}$ in FIG. 3. i.e. $I_{10} \approx I_{20}$.

The nickel cadmium battery 1N differs from the lithium ion battery 1L in that even if it is charged with a constant current, the charging current $I_2$ does not fall. However, as the nickel cadmium battery 1N is charged, its terminal voltage $V_2$ gradually becomes larger, as shown in FIG. 4. When the terminal voltage $V_2$ for the battery 1N then reaches the fully charged voltage $V_N$, the terminal voltage $V_2$ drops slightly. The $-\Delta V$ detection circuit 19 then detects this drop in the terminal voltage $V_2$ ($-\Delta V$) and outputs this detection signal to the control circuit 17. When the control circuit 17 receives this detection signal input, the switch 11 is turned off and the charging operation is stopped.

Also, the voltage $V_N$ for the nickel cadmium battery 1N is set at a value which is smaller than that of the voltage $V_L$ for the lithium ion battery 1L. If the nickel cadmium battery 1N is then charged up to a voltage $V_L$ during normal operation, breakdown will not occur.

Second Embodiment

Figure 5:
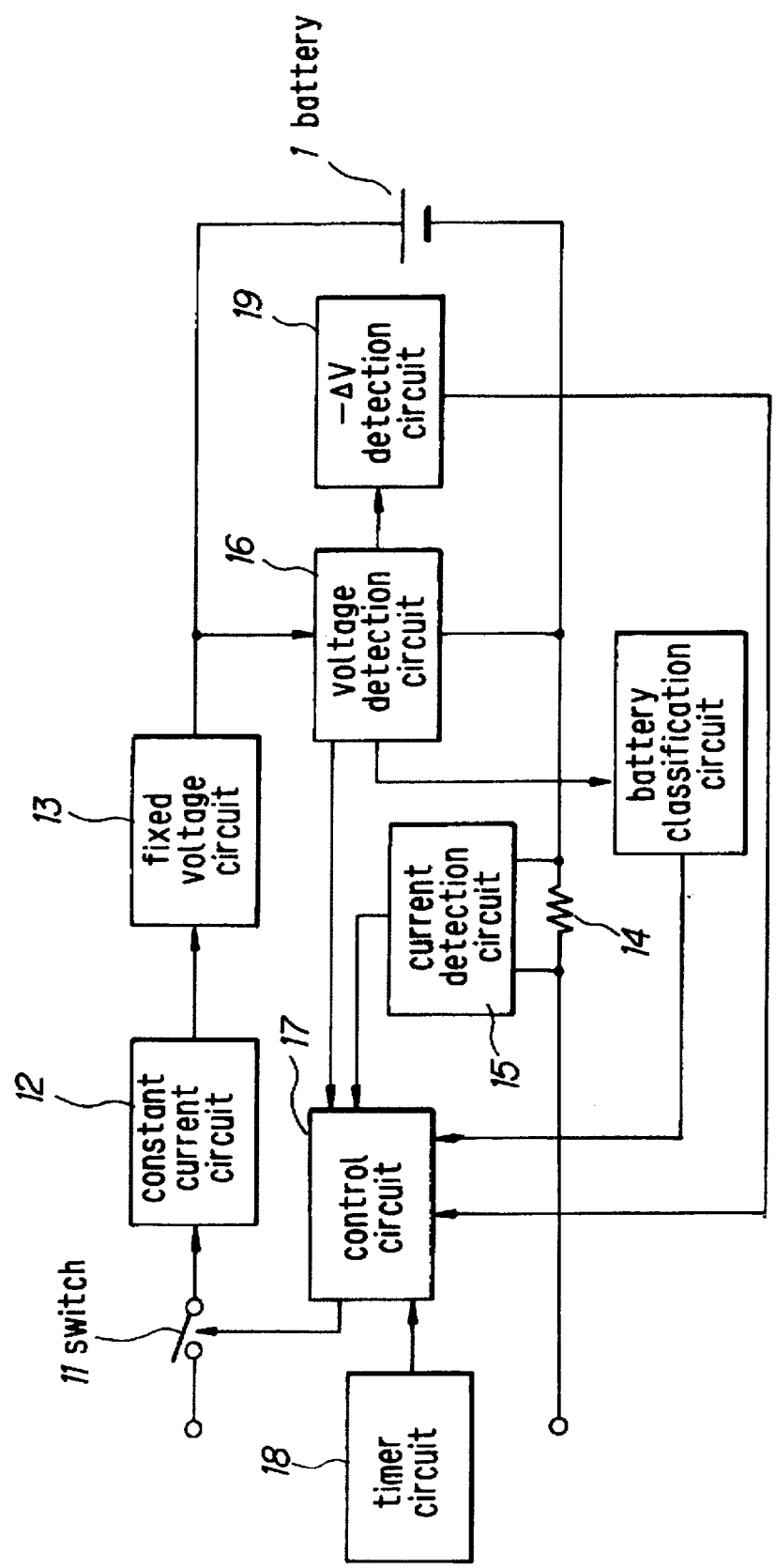
FIG. 5 is a block view showing the structure of a second charging equipment embodiment.
Figure 6:
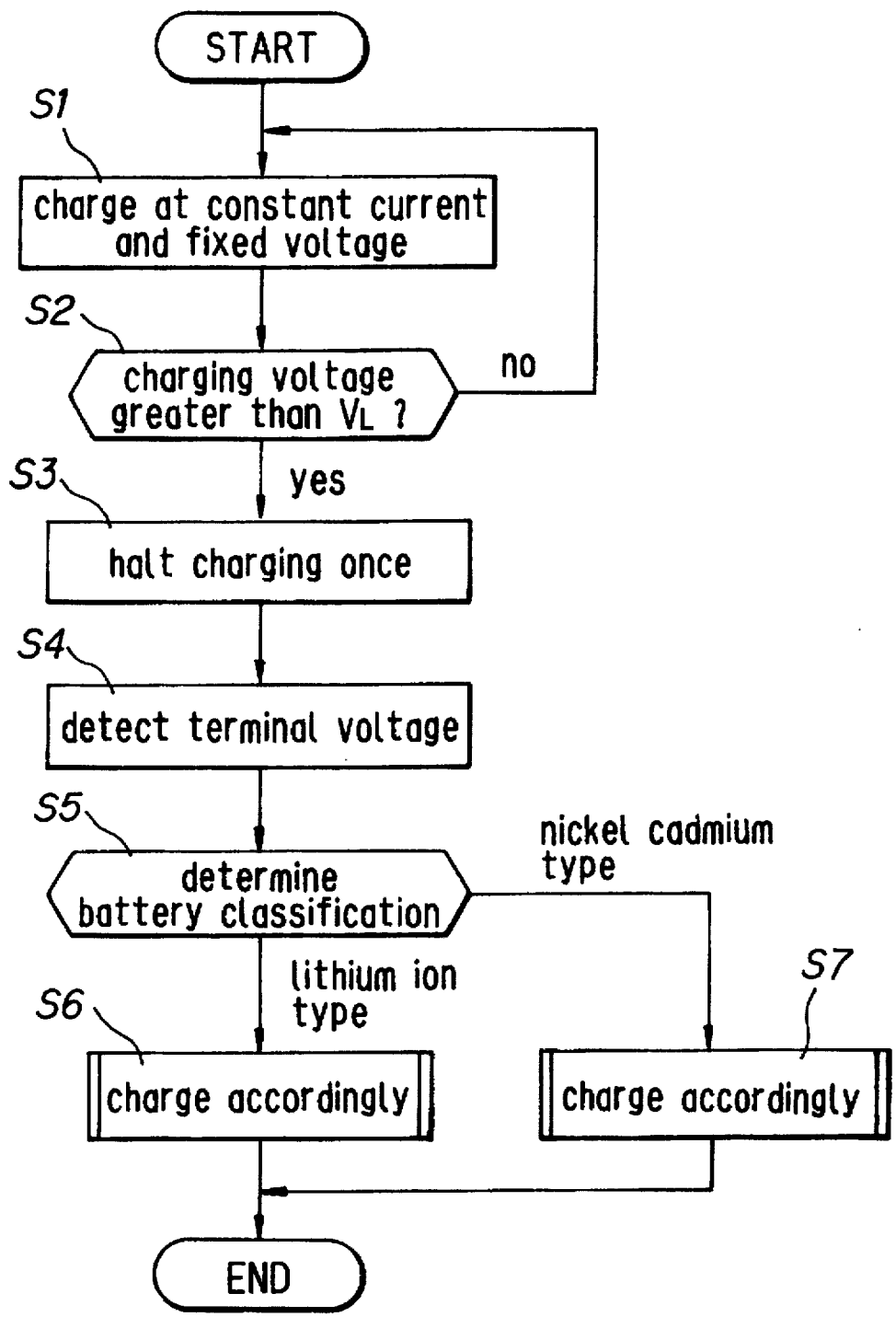
FIG. 6 is a flowchart describing the operation of the embodiment in FIG. 5.

FIG. 5 is a view showing the structure of charging equipment for a second embodiment of this invention. In this embodiment, the output of the voltage detection circuit 16 is sent to a voltage classification circuit 31 so that it may be determined which type (classification) of battery is being charged. The output from this battery classification circuit 31 is then sent to the control circuit 17. Other aspects of the structure are the same as for that shown in FIG. 2. A charging operation of the kind shown in the flowchart in FIG. 6 is carried out for this embodiment in FIG. 5.

In the initial step S1, charging is carried out using the constant current circuit 12 and the fixed voltage circuit 13. i.e. initially, the charging operation is carried out almost completely by the constant current circuit 12, as was the case in the embodiment in FIG. 2.

This charging is then continued until it is determined that the charging voltage (not the terminal voltage for the battery 1) has reached a predetermined standard value (the full charging voltage $V_L$).

The process then goes onto step 3 when the charging voltage reaches the voltage $V_L$, the control circuit 17 turns the switch 11 off once at a prescribed timing and the charging operation is halted. The terminal voltage for the battery 1 is then detected by the voltage detecting circuit 16 in step S4. Next, in step S5, the type of the battery 1 is determined from the terminal voltage detected in step 4.

Figure 7:
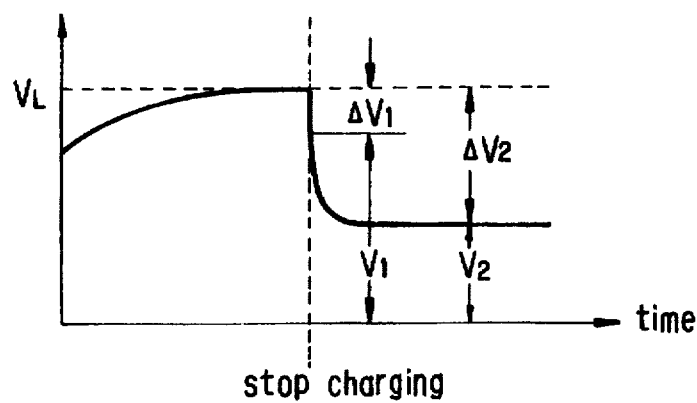
FIG. 7 is a view describing the theory of determining the type of battery in step S5 in FIG. 6.

FIG. 7 describes the theory of how the type of the battery 1 is determined from the detected terminal voltage. As shown in FIG. 7, when charging is stopped, the terminal voltage for the battery 1 drops a little from the voltage at the time of charging as a result of discharge, after which this voltage stabilizes at a prescribed voltage. However, the voltage at which this stabilization takes place is smaller ($V_2$) in the case of a nickel cadmium battery 1N than it is in the case ($V_1$) of a lithium ion battery 1L. i.e. the terminal voltage for a nickel cadmium battery drops to lower terminal voltage when charging is stopped.

In other words, the extent of the drop from the full charging voltage $V_L$ for the battery 1 after the charging operation has been stopped is smaller ($\Delta V_1$) for a lithium ion battery 1L than it is ($\Delta V_2$) for a nickel cadmium battery 1N. i.e. the following equation is satisfied.

$$V_1 > V_2$$
$$\Delta V_1 < \Delta V_2$$

The voltage classification circuit 31 has a prescribed standard value between the voltages $V_1$ and $V_2$ or a prescribed standard voltage between $\Delta V_1$ and $\Delta V_2$. It then compares $V_1$ or $V_2$ with this standard value or compares $\Delta V_1$ or $\Delta V_2$ with this standard value. If it is then determined, for example, that $V_1$ is larger than the standard value or that $\Delta V_1$ is smaller than the other standard value, it is determined that the battery being charged is a lithium ion battery 1L.

Alternatively, if it is determined that the voltage $V_2$ is smaller than the standard value or that $\Delta V_2$ is larger than the other standard value, is determined that the item being charged is a nickel cadmium battery 1N.

When it is determined that the item being charged is a lithium ion battery 1L, step 6 is gone onto. When it is determined to be a nickel cadmium battery 1N, step S7 is gone onto. The appropriate charging methods are then used to charge the respective batteries.

Figure 8:
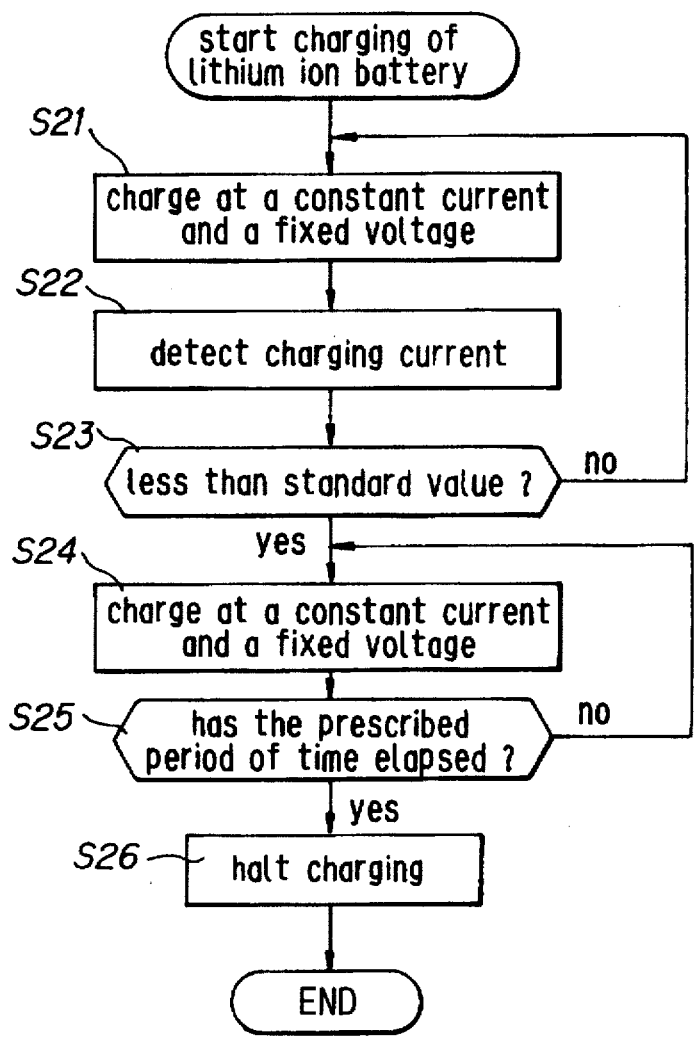
FIG. 8 is a flowchart describing the charging method for the lithium ion battery in step S6.
Figure 9:
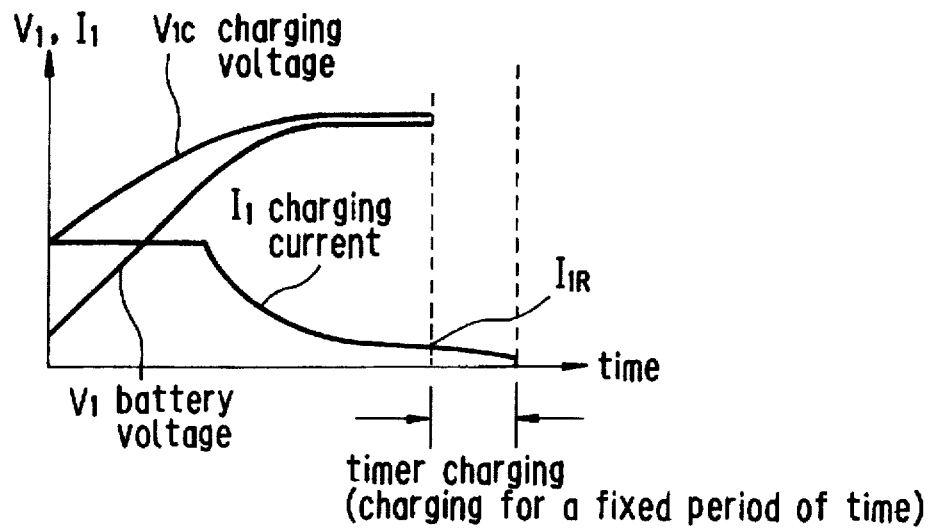
FIG. 9 is a view describing the charging which uses the method shown in the flowchart in FIG. 8.

FIG. 8 shows an example of the lithium ion battery charging method which occurs in step S6 of FIG. 6. Initially in step S21, the charging process is carried out by both the constant current circuit 12 and the fixed voltage circuit 13, as shown in the same diagram. The charging current for the battery 1 is then detected by the current detecting circuit 15 in step S22. If it is then determined in step S23 that the charging current detected in step S22 is not less than the predetermined standard value, step S21 is returned to and the charging operation is continued. If it is determined in step 23 that the charging current detected in step S22 is below the predetermined standard value, step S24 is gone onto, and the constant current and fixed voltage charging is continued. In step S25, after it has been detected that the charging current in step S23 has become less than the standard value, the charging is repeated until a predetermined period of time has passed. When this prescribed period of time has passed, step S26 is gone onto and the charging operation is halted.

The terminal voltage $V_1$ for the battery 1 gradually becomes large as the charging operation progresses and the difference between it and the charging voltage $V_{1C}$ becomes small accordingly. It is therefore possible to detect the difference between the charging voltage $V_{1C}$ and the terminal voltage $V_1$ and then detect that the voltage has become the fully charged voltage from when this difference has become less than a prescribed standard value set up beforehand. However, it is difficult to detect the value for the difference between the charging voltage $V_{1C}$ and the terminal voltage $V_1$ accurately when this difference becomes small. Therefore, the charging operation is only continued for a predetermined fixed period of time once the charging current becomes equal to a predetermined standard value $I_{1R}$. The charging operation is then halted once this fixed period of time has elapsed. This fixed period of time is the time which has to elapse for the terminal voltage to become equal to the full charging voltage $V_L$ and is set by experiment etc.

Figure 10:
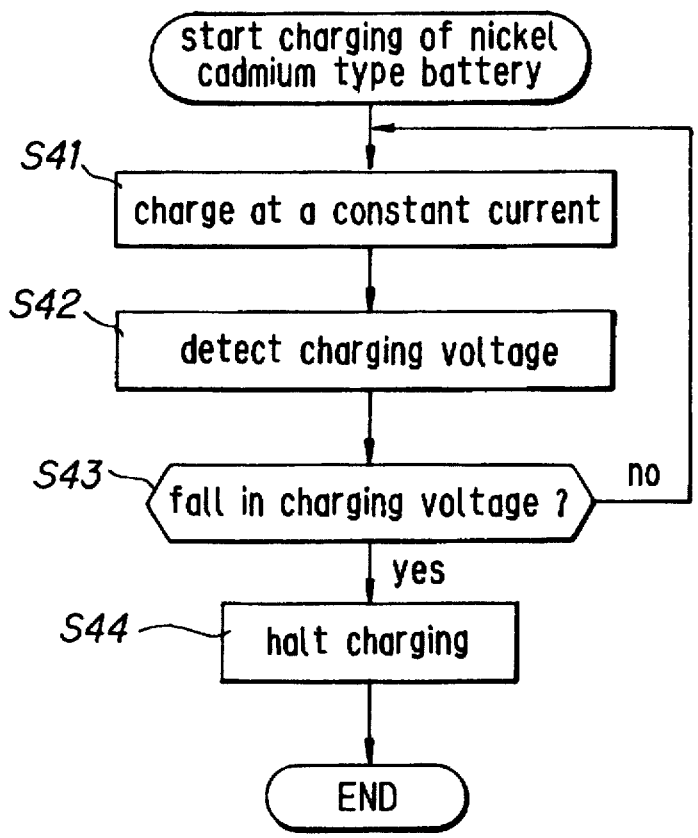
FIG. 10 is a flowchart describing the charging method for the nickel cadmium battery occurring in step 7 of FIG. 6.

FIG. 10 is a view showing an example of the charging operation for the nickel cadmium battery in step 7 of FIG. 6. In this embodiment, initially in step 41, a constant current is provided by the constant current circuit 12. At this time, the fixed voltage circuit 13 is practically not operating because the internal impedance of the battery 1N is small. The terminal voltage for the battery 1N (charging voltage) is then obtained in step S42. It is then determined whether or not the terminal voltage has fallen in step S43. i.e. A fall $(-\Delta V)$ in the terminal voltage for the battery 1N is detected by the $-\Delta V$ detection circuit 19. If the terminal voltage for the battery 1N has not fallen below that detected for the previous time, step S41 is returned to and constant current charging is continued.

When it is determined in step 43 that the terminal voltage for the battery 1N has fallen below that detected for the previous time (when $-\Delta V$ is detected), step 44 is gone on to, the switch 11 is turned off and the charging operation is stopped.

The current detection circuit 15 for detecting the timing of when the lithium ion battery becomes fully charged and the $-\Delta V$ detection circuit 19 for detecting the timing of when the nickel cadmium battery becomes fully charged are both operated in synchronization, both after the type of the battery has been determined and before the type of the battery is known. In this way, a more stable charging operation can be attained.

Third Embodiment

Figure 11:
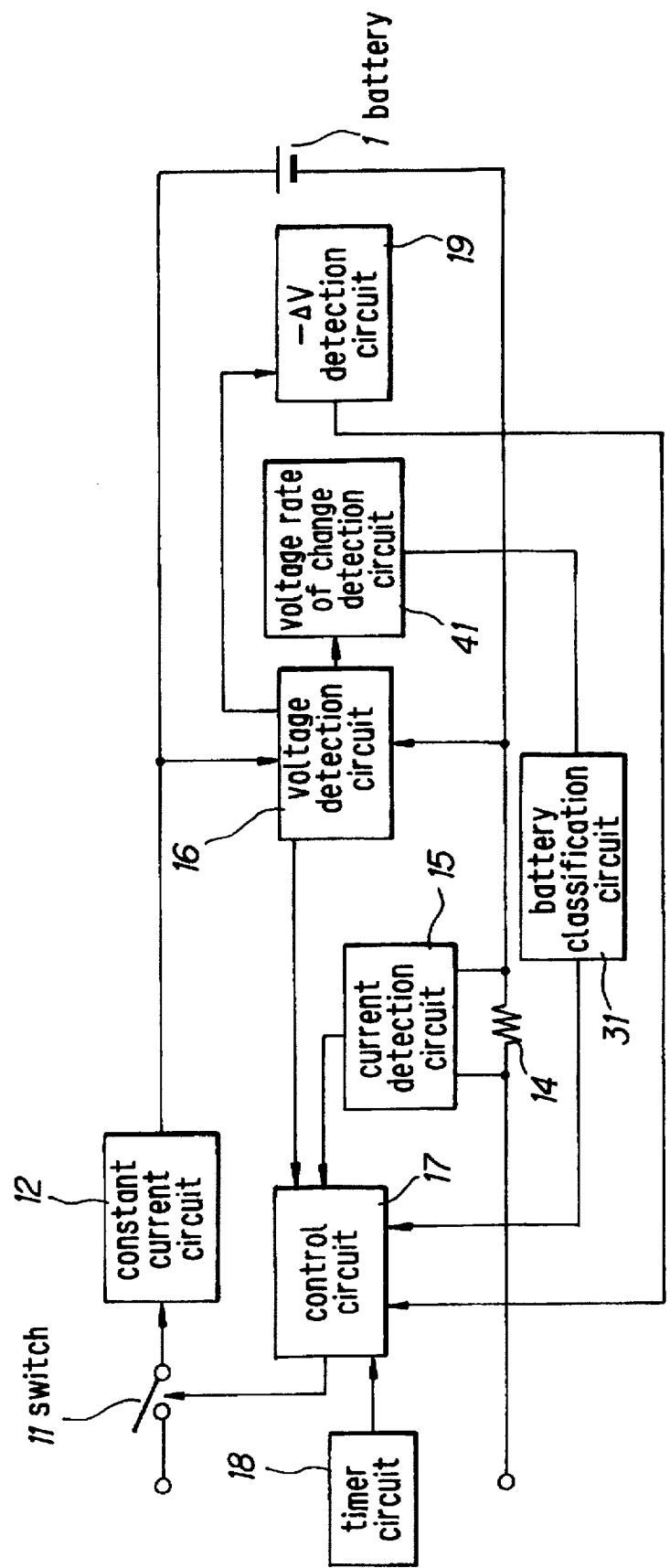
FIG. 11 is a block view showing the structure of a third charging equipment embodiment.

FIG. 11 is a view of a third embodiment of an item of charging equipment. In this embodiment, the fixed voltage circuit 13 in the embodiment in FIG. 5 is omitted and the battery 1 is charged by only using the constant current circuit 12. Also, a voltage rate of change circuit 41 detects the rate of change of the terminal voltage for the battery 1 and this detection signal is outputted to the voltage classification circuit 31. The voltage classification circuit 31 then determines the type of the battery from the output for the voltage rate of change circuit 41. Other aspects of the structure are the same as for the case in FIG. 5.

Figure 12:
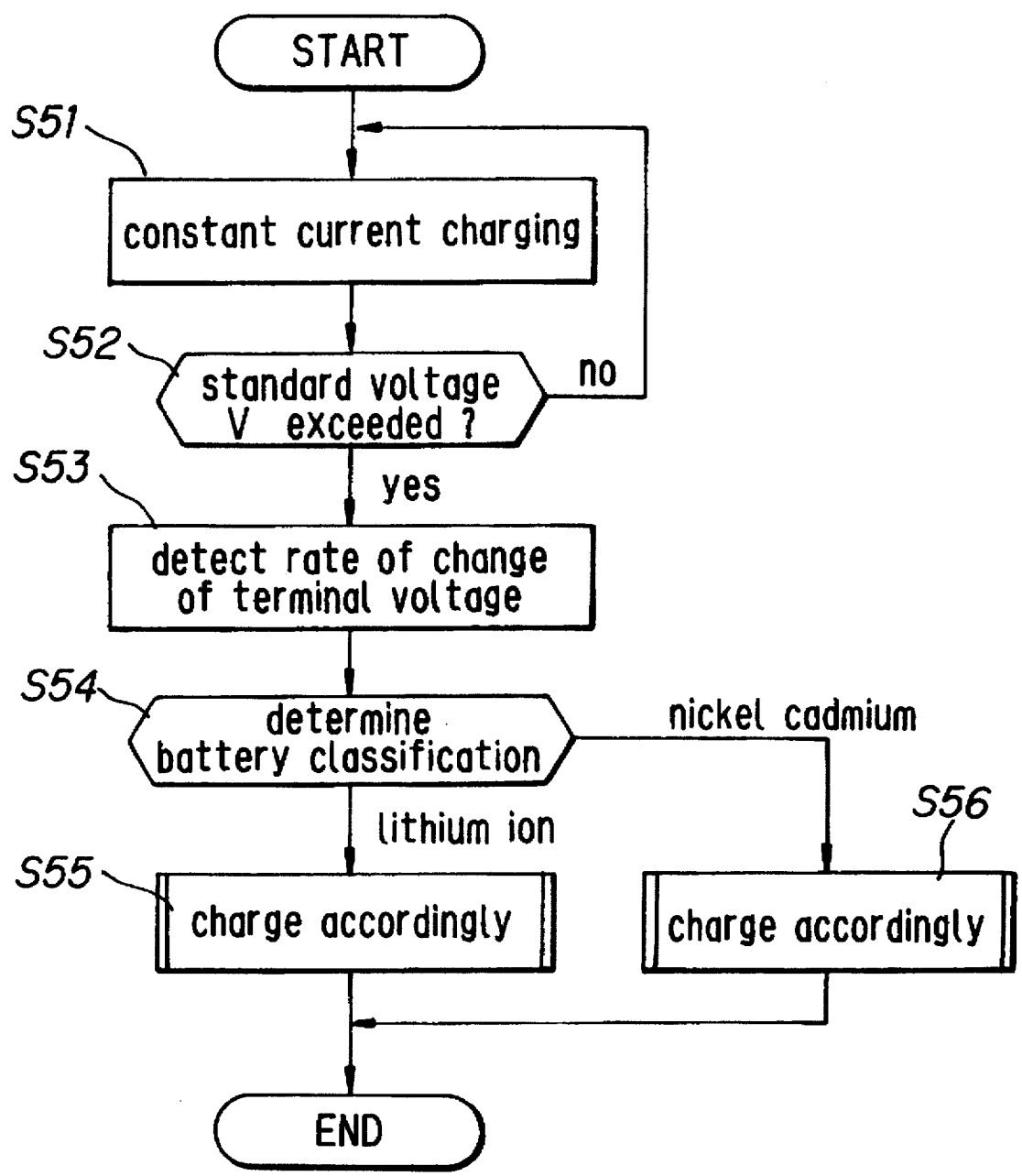
FIG. 12 is a flowchart describing the operation of the embodiment in FIG. 11.

FIG. 12 is a view showing the operation of the embodiment shown in FIG. 11. First, in step 51, the switch 11 is turned on and the battery 1 is charged by the constant current circuit 12. Next, in step 52, the control circuit 17 detects the terminal voltage (charging voltage) for the battery 1 using the voltage detection circuit 16. It is then determined whether or not the terminal voltage for the battery 1 is larger than the full charging voltage $V_L$ for a lithium ion battery. When it is smaller than the full charging voltage $V_L$, step 51 is returned to and constant current charging is continued using the constant current circuit 12.

When it is determined in step 52 that the terminal voltage for the battery 1 has become larger than the voltage $V_L$, step 53 is gone onto and the rate of change of the terminal voltage for the battery 1 is detected. The type of the battery is then determined in step 54 from the rate of change detected in step 53. i.e. the voltage rate of change detection circuit 41 detects the rate of change of the terminal voltage for the battery 1 and outputs this rate of change to the battery classification circuit 31. The battery classification circuit 31 then determines the type of battery from this rate of change and outputs the determination result to the control circuit 17.

Figure 13A:
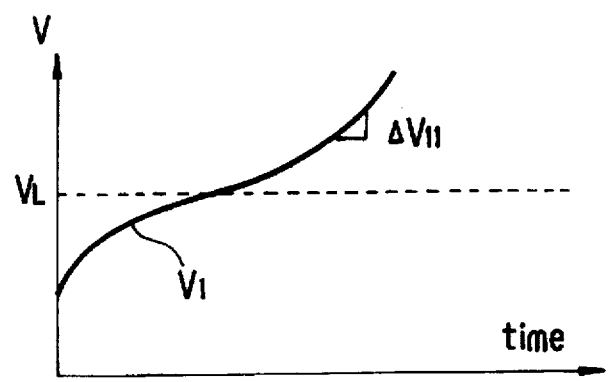
FIGS. 13A and 13B are a view describing the theory of the battery determination occurring in step S54 of FIG. 12.
Figure 13B:
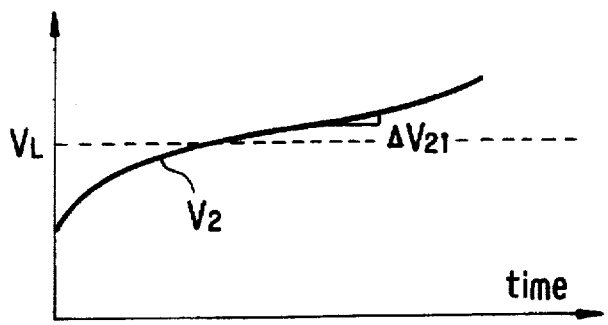

FIGS. 13A and 13B show the theory of how the battery type is determined from the voltage rate of change in step 54. i.e. when the item being charged is a lithium ion battery 1L the change in the terminal voltage is as that indicated by $V_1$ in FIG. 13A and when the item being charged is a nickel cadmium battery 1N, the change in the terminal voltage is as shown by $V_2$ in FIG. 13B.

For example, as shown in FIG. 13, the rate of change $\Delta V_{11}$ directly after the full charging voltage $V_L$ for the lithium ion battery terminal voltage has been exceeded is greater than the rate of change $\Delta V_{21}$ directly after the full charging voltage $V_N$ for the nickel cadmium battery terminal voltage has been exceeded. When this rate of change of voltage is then larger than a predetermined standard value it is determined that the battery is a lithium ion battery and when it is smaller than a standard value it is determined that the battery is a nickel cadmium battery.

Figure 14A:
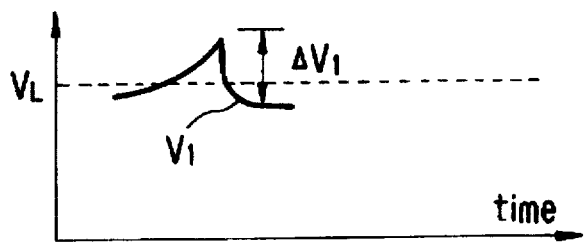
FIGS. 14A and 14B are a view describing a further theory for the battery determination occurring in step S54 of FIG. 12.
Figure 14B:
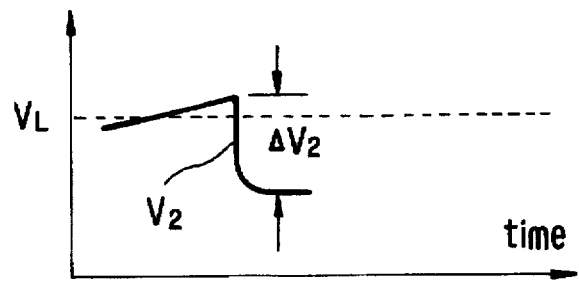

Alternatively, the rate of change of the terminal voltage can be detected in the way shown in FIGS. 14A anb 14B. In this embodiment, the charging operation is halted once when the battery terminal voltage becomes larger than the voltage $V_L$. When the charging operation is halted, discharge commences and the terminal voltage falls sharply before leveling out at a more or less stable voltage. The difference between the fixed voltage directly before the halt in the charging and after the halt in charging is smaller $(\Delta V_1)$ in the case for the lithium ion battery 1L shown in FIG. 14A than it is in the case for the nickel cadmium battery 1N shown in FIG. 14B $(\Delta V_2)$. It can then be determined whether or not the battery is a lithium ion battery or a nickel cadmium battery by making comparisons with a standard value which falls between both parties.

After the battery type has been determined in step 54 in any of the above ways, the process goes on to step 55 or step 56. Charging is then carried out using a charging method which is compatible with either a lithium ion battery 1L or a nickel cadmium battery 1N. The charging methods in steps S55 and S56 are the same as the charging methods in step S6 (FIG. 8) and step S7 (FIG. 10) in FIG. 6.

Fourth Embodiment

Figure 15:
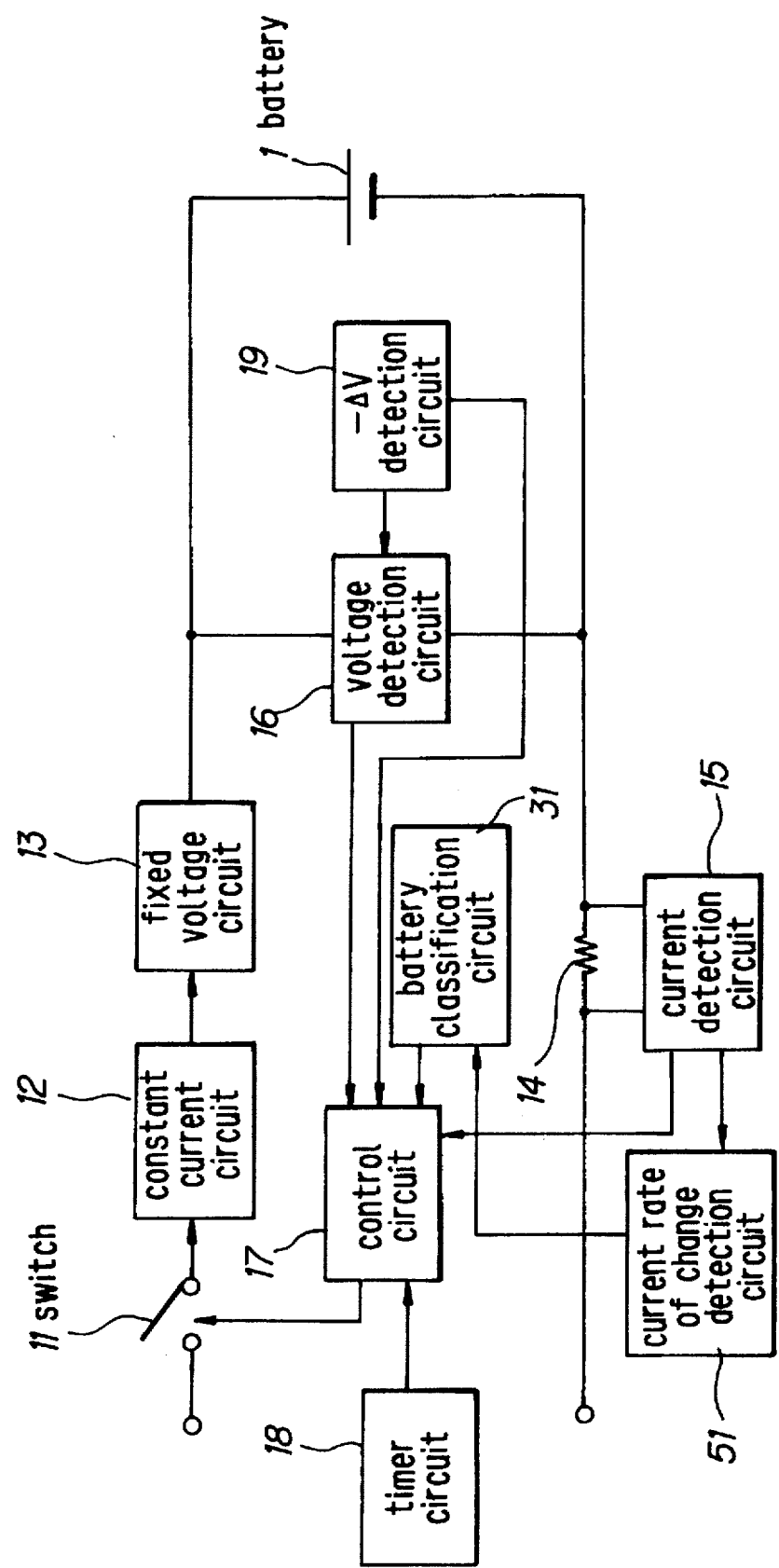
FIG. 15 is a block view showing the structure of a fourth charging equipment embodiment.

FIG. 15 is a view of a fourth embodiment of an item of charging equipment. Here, a current rate of change circuit 51 is set up and the rate of change of the current is detected from the output from the current detection circuit 15. The output from the current rate of change circuit 51 is sent to the battery classification circuit 31, which then determines the type of the battery from this output and outputs the determination result to the control circuit 17. Other aspects of the structure are the same as for the case shown in FIG. 5.

Figure 16:
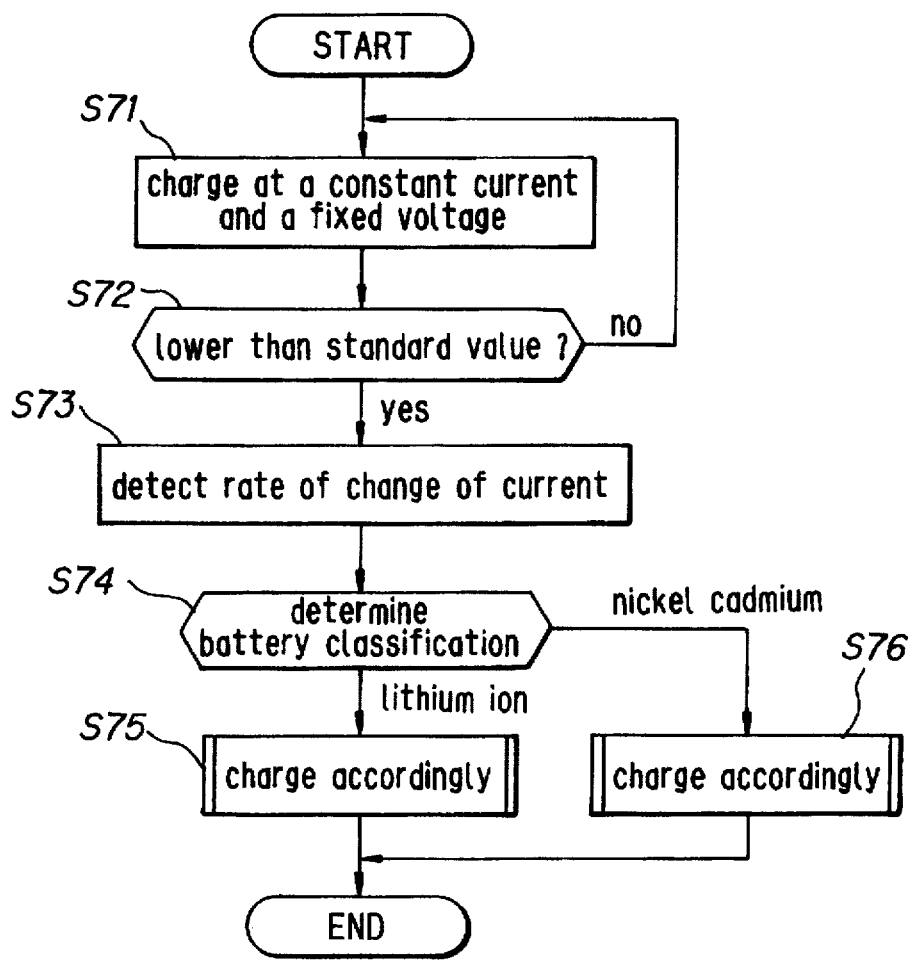
FIG. 16 is a flowchart describing the operation of the embodiment in FIG. 15.

FIG. 15 and FIG. 16 show how this embodiment operates. First, in step S71, switch 11 is turned on and the charging operation is started using the constant current circuit 12 and the fixed voltage circuit 13. Then, in step 72, the charging current is detected by the current detection circuit 15 and this value is compared with a predetermined standard value. This standard value is taken to be a value which is smaller than the charging current $I_{10}(\approx I_{20})$. When the charging current is less than this standard value, step S71 is returned to and the charging operation is continued.

When it is determined in step S72 that the charging current is lower than the standard value, the process goes on to step S73 and the current rate of change detection process is carried out. i.e. at this time, the current rate of change detection circuit 51 monitors the output from the current detection circuit 15 and detects the rate of change of the charging current. Step S74 is then gone onto and the battery classification circuit 31 determines the battery type from the rate of change of the current detected in step S73.

Figure 17:
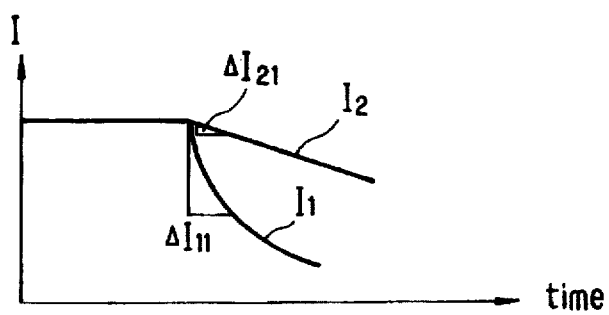
FIG. 17 is a view describing the theory of the battery type determination occurring in step S74 in FIG. 16.

FIG. 17 shows the theory of how the battery type is determined from the rate of change of the current. In FIG.

17, the rate of change $\Delta I_{11}$ of the charging current $I_1$ for a lithium ion battery is larger than the rate of change $I_{21}$ of the charging current $I_2$ for a nickel cadmium battery. The rate of change detected in step S73 is therefore compared with a predetermined standard value. If the detected rate of change of the current is larger than the predetermined standard value, it can be determined that the item being charged is a lithium ion battery 1L. If it is smaller than the standard value, it can be determined to be a nickel cadmium battery 1N.

The battery type could also be determined from the charging current $I_1$ for a lithium ion battery being smaller than the charging current $I_2$ for a nickel cadmium battery.

When the type of the battery has been determined in step S74, either step S75 or step S76 is gone onto depending on the determination result. Charging is then carried out using a charging method which depends on whether the battery is a lithium ion battery or a nickel cadmium battery.

Fifth Embodiment

Figure 18:
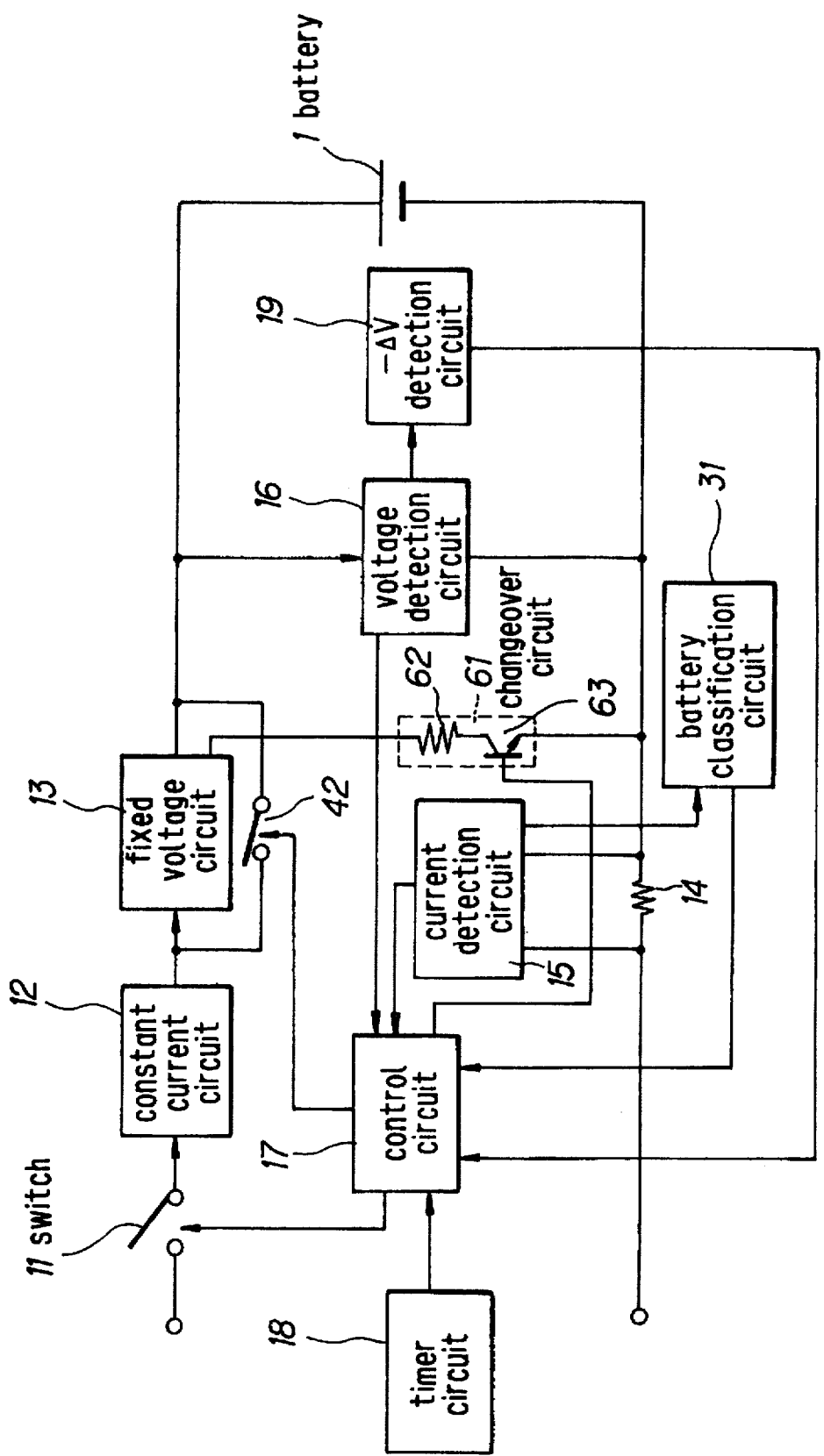
FIG. 18 is a block view showing the structure of a fifth charging equipment embodiment.

FIG. 18 is a view of a fifth embodiment of an item of charging equipment. In this embodiment, the output from the current detection circuit 15 is sent to the battery classification circuit 31 which then determines the type of the battery from this input and outputs a determination signal to the control circuit 17.

A bypass switch 42 which causes the fixed voltage circuit 13 to be bypassed is connected in parallel with the fixed voltage circuit 13, and the control circuit 17 can turn this switch on and off. There is also a changeover circuit 61 for changing the fixed voltage for the fixed voltage circuit 13 over to a higher fixed voltage. In this embodiment, the changeover circuit consists of a resistor 62 and an NPN transistor 63 connected together in series. Other aspects of this structure are the same as for the case in FIG. 5.

Figure 19:
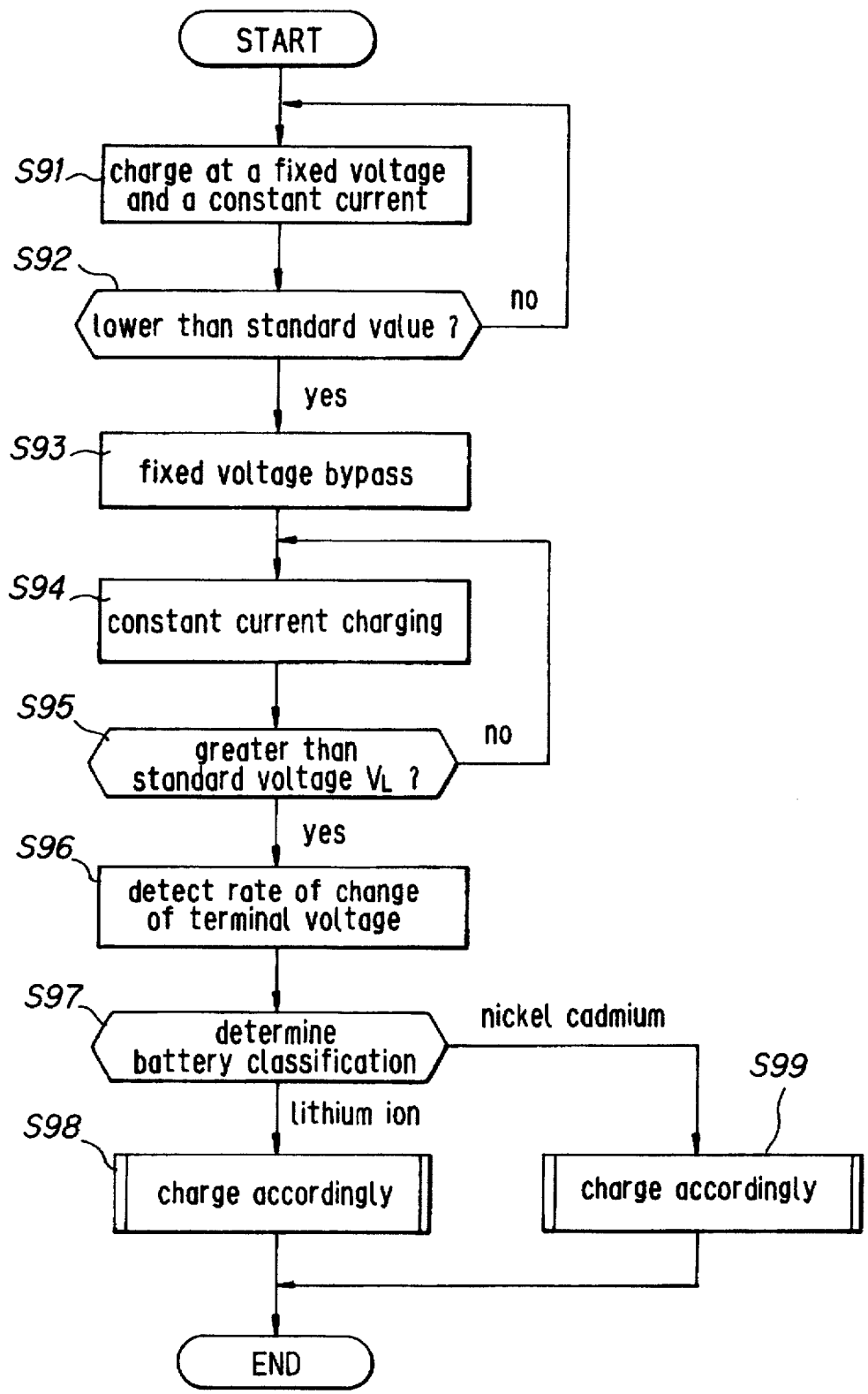
FIG. 19 is a flowchart describing the operation of the embodiment in FIG. 18.

Next, the operation of the embodiment in FIG. 18 will be described with reference to the flowchart in FIG. 19. First, in step 91, charging is carried out using the constant current circuit 12 and the fixed voltage circuit 13. In step 92, the charging detection circuit 15 detects the charging current while this charging is taking place. If the charging current is then larger than a predetermined standard value, step S91 is returned to and the charging operation is continued. This standard value is set to be a value which is smaller than the charging current $I_{10}$.

When it is determined in step S92 that the charging current is less than a standard value, step 93 is gone onto, the switch 42 is turned on and the fixed voltage circuit 13 is effectively removed (bypassed). After this, charging is carried out using a constant current from the constant current circuit 13.

Alternatively, in step S93, rather than removing the fixed voltage circuit 13, the changeover circuit 61 may be controlled so that the operation stays the same even if a higher voltage is outputted from the fixed voltage circuit 13.

Next, step S94 is gone onto and constant current charging using the constant current circuit $1_2$ is carried out. From hereon, the process in step S94 to step S99 is the same as the process in step S51 to S56 in FIG. 12 (the process in the case of the embodiment in FIG. 11).

Sixth Embodiment

Figure 20:
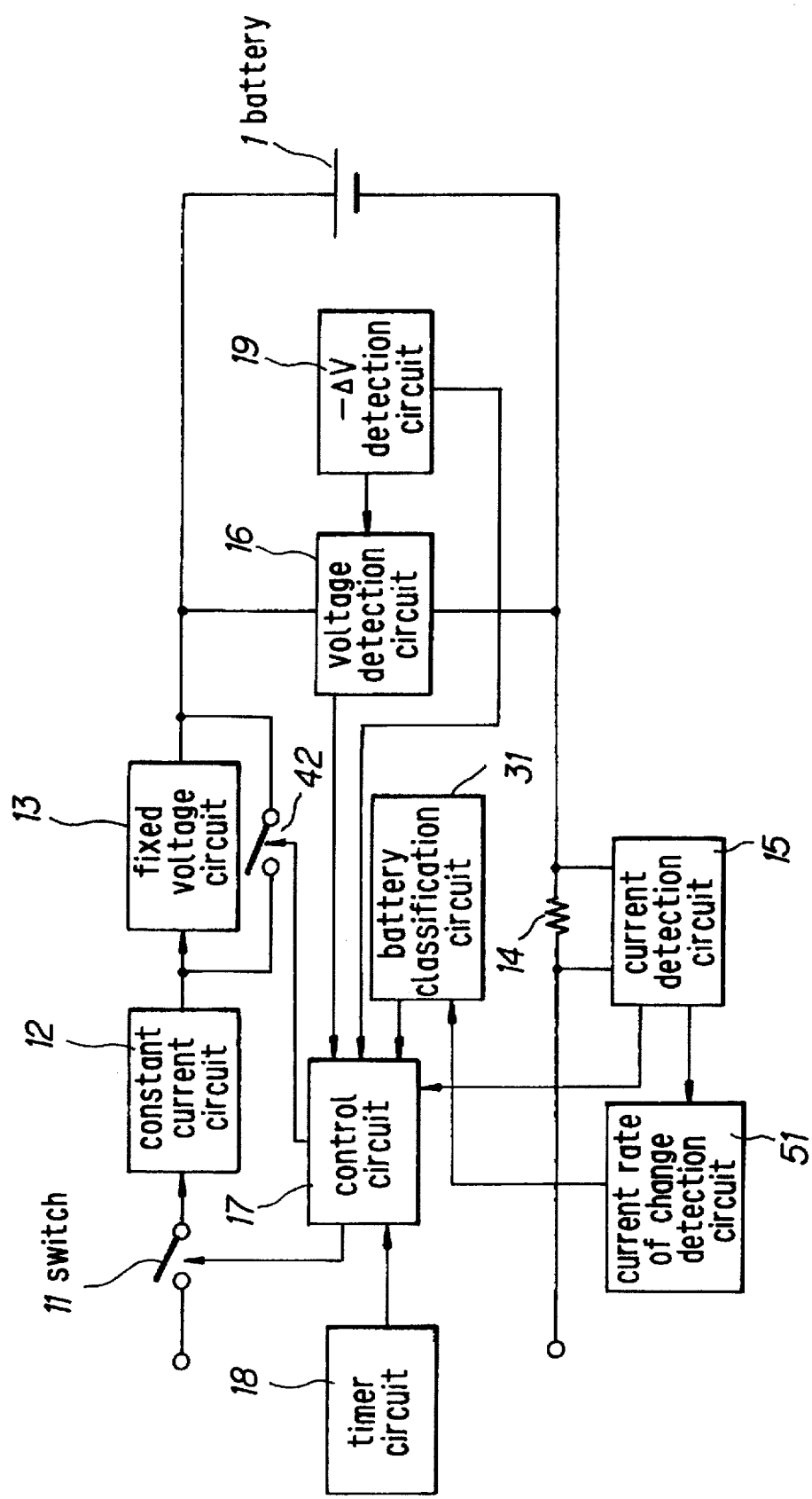
FIG. 20 is a block view showing the structure of a sixth charging equipment embodiment.

FIG. 20 is a view of a sixth embodiment of an item of charging equipment. In this embodiment, a switch 42 is connected in parallel with the fixed voltage circuit 13. Other aspects of the structure are the same as for the case in FIG. 5.

Figure 21:
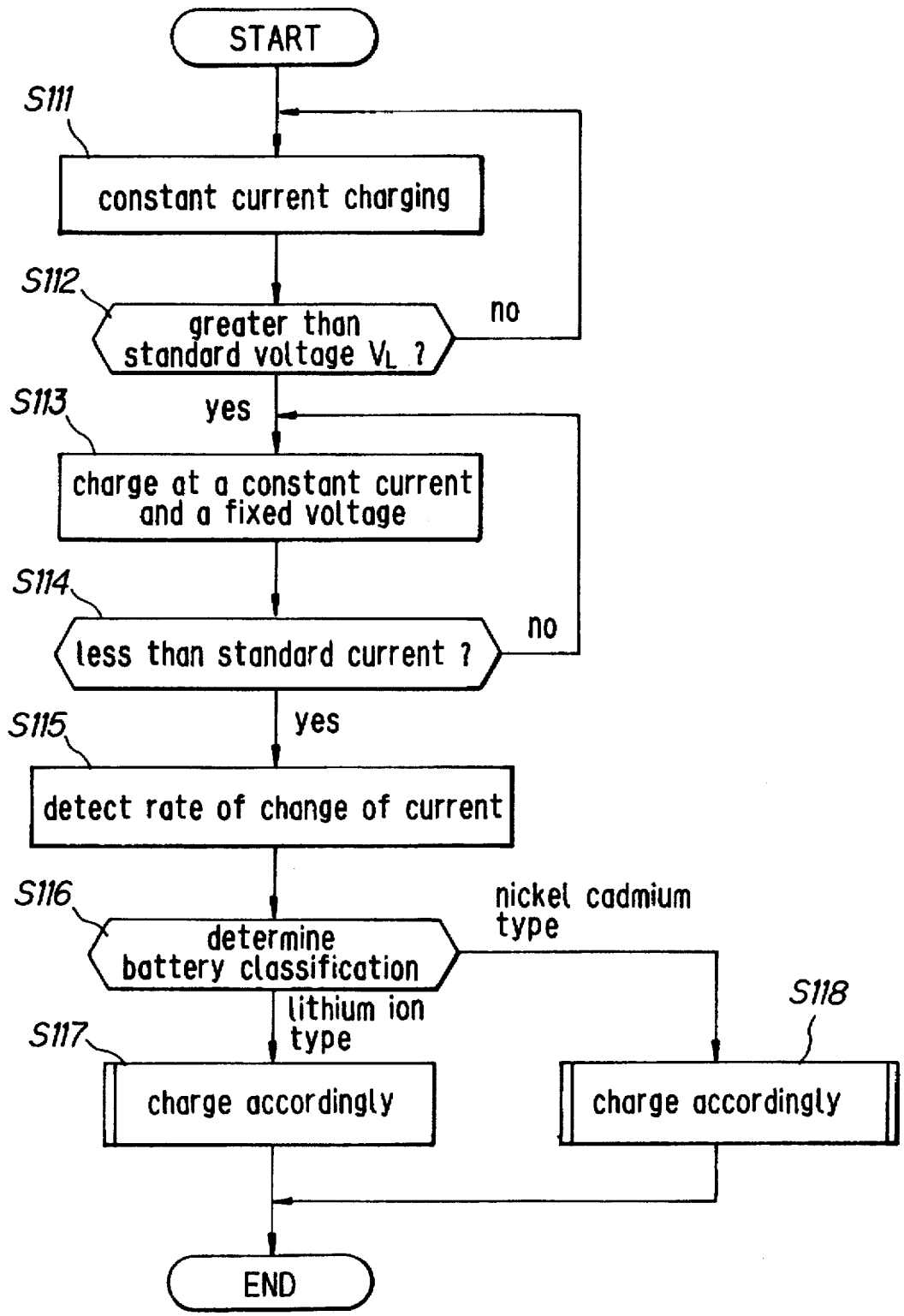
FIG. 21 is a flowchart describing the operation of the embodiment in FIG. 20.

FIG. 21 is a view describing the operation of the embodiment in FIG. 20. First, in step S111, constant current charging is carried out. i.e. the control circuit 17 turns the switch 42 on and the fixed voltage circuit 13 is effectively short circuited. The switch 11 is then turned on and the battery 1 is charged by a constant current outputted from the constant current circuit 12.

Next, the process goes onto step S112 where it is determined whether or not the terminal voltage for the battery 1 is less than the full charging voltage $V_L$ for a lithium ion battery. i.e. the control circuit 17 samples the terminal voltage (charging voltage) of the battery 1 via the voltage detection circuit 16. When this terminal voltage is smaller than the voltage $V_L$, step S11 is returned to and the application of the fixed charging current continues. This operation is repeated until it is determined that the terminal voltage for the battery 1 has become greater than the voltage $V_L$.

When it is determined in step S112 that the terminal voltage is greater than the voltage $V_L$, the process goes on to step S113 and charging is carried out at a constant current and a fixed voltage. i.e. the control circuit 17 turns the switch 42 off at this time and charging is carried out using the constant current circuit 12 and the fixed voltage circuit 13. The process after this in step S113 to step S118 is the same as the process in step S71 to step S76 in FIG. 16 (the process for the embodiment in FIG. 15).

Seventh Embodiment

Figure 22:
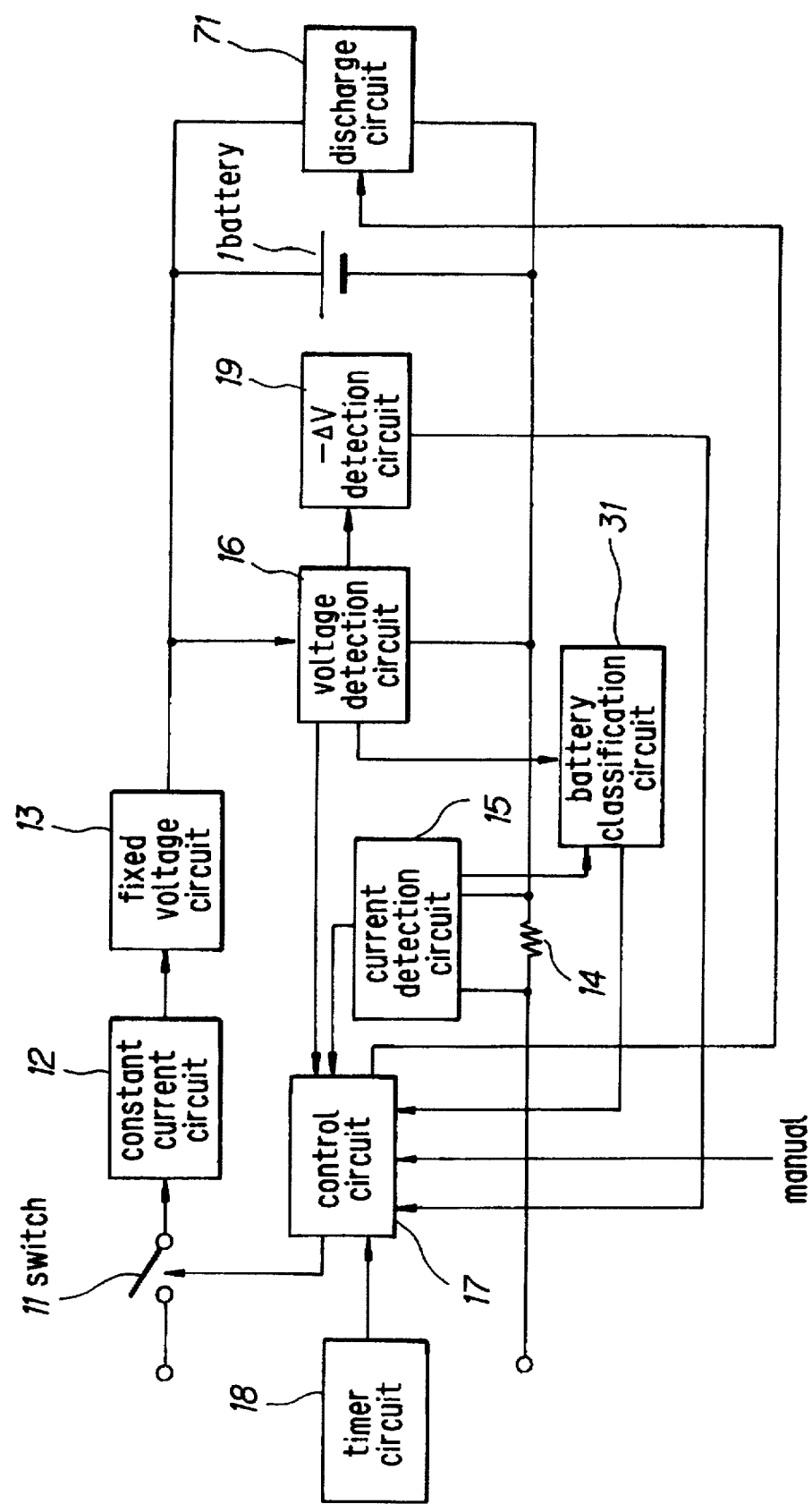
FIG. 22 is a block view showing the structure of a seventh charging equipment embodiment.

FIG. 22 is a view showing a seventh embodiment of this invention. In this embodiment, the battery 1 and a discharge circuit 71 are set up in parallel and the discharge circuit 71 is controlled either automatically by the control circuit 17 or manually by commands from the user. Other aspects are the same as for the case in FIG. 5.

In this embodiment, when it is determined that the battery 1 is a nickel cadmium battery 1N, the control circuit 17 controls the discharge circuit 17 and charging commences after the battery 1N has been discharged once. In this way, the influence of the memory effect of the battery 1N is reduced.

It is, naturally, possible in this embodiment to discharge the battery 1 via the discharge circuit 71.

Eighth Embodiment

Figure 23:
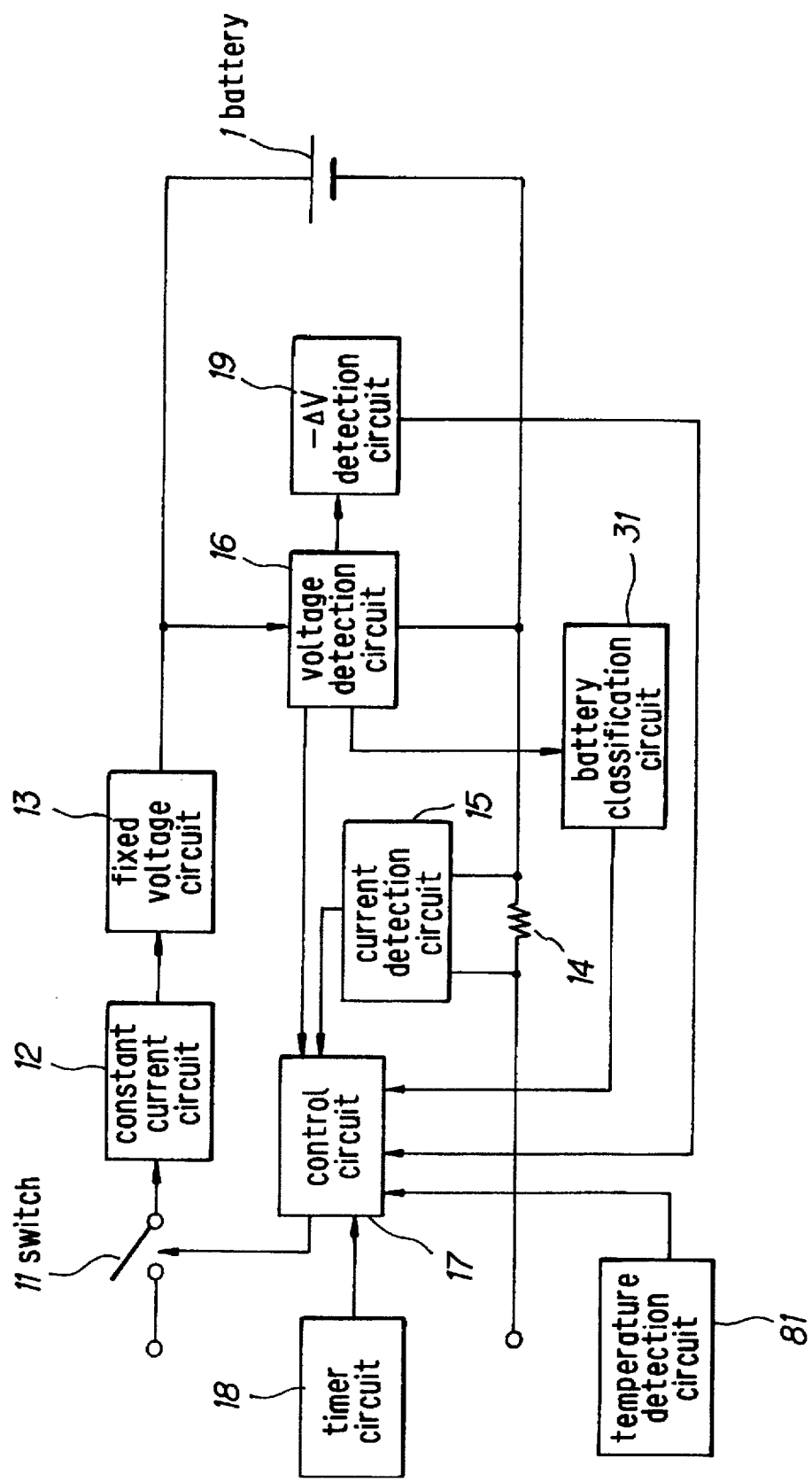
FIG. 23 is a block view showing the structure of an eighth charging equipment embodiment.

FIG. 23 is a view of an eighth embodiment. In this embodiment, a temperature detection circuit 81 is set up which detects the temperature of the battery 1 and sends a detection output to the control circuit 17. Other aspects of the structure are the same as for the case in FIG. 5.

In this embodiment, if the temperature detected by the temperature detection circuit 81 is lower than a predetermined standard value, the control circuit switches the switch 11 off and the charging operation is halted. If the temperature is lower than the predetermined standard value it is difficult to charge the battery 1 sufficiently.

In this embodiment in FIG. 23, when the temperature detected by the temperature detection circuit 81 is lower than the predetermined standard value, charging is carried out in the same way as for the embodiment shown in FIG. 2 and when it is higher than the standard temperature the charging may be carried out in the way shown in FIG. 5, FIG. 11, FIG. 15, FIG. 18 or FIG. 20.

Ninth Embodiment

Figure 24:
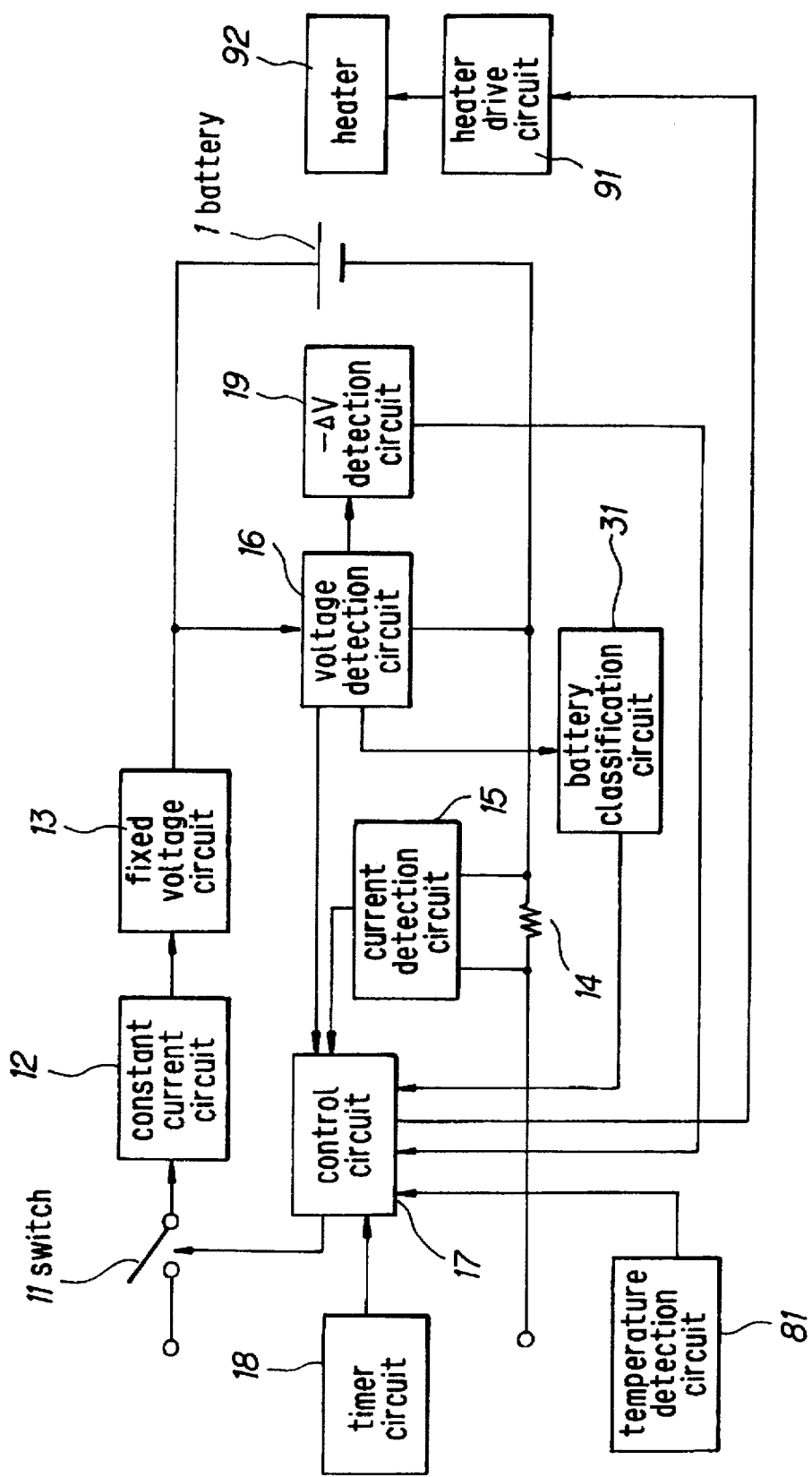
FIG. 24 is a block view showing the structure of a ninth charging equipment embodiment.

FIG. 24 is a view of a ninth embodiment. In this embodiment, in addition to the structure shown in FIG. 23, a heater 92 which is driven by a heater drive circuit 91 is set up so that heat can be applied to the battery 1. Other aspects of the structure are the same as for the case in FIG. 23.

In the embodiment in FIG. 23, the heat detection circuit 81 detects the temperature and if it is lower than the standard temperature the control circuit 17 drives the heater 92 via the heater drive circuit 91 so that heat is applied to the battery 1. When the temperature of the battery then rises above a standard temperature, charging is carried out using the method in FIG. 2, FIG. 5, FIG. 11, FIG. 15, FIG. 18, FIG. 20 or FIG. 22.

Figure 25:
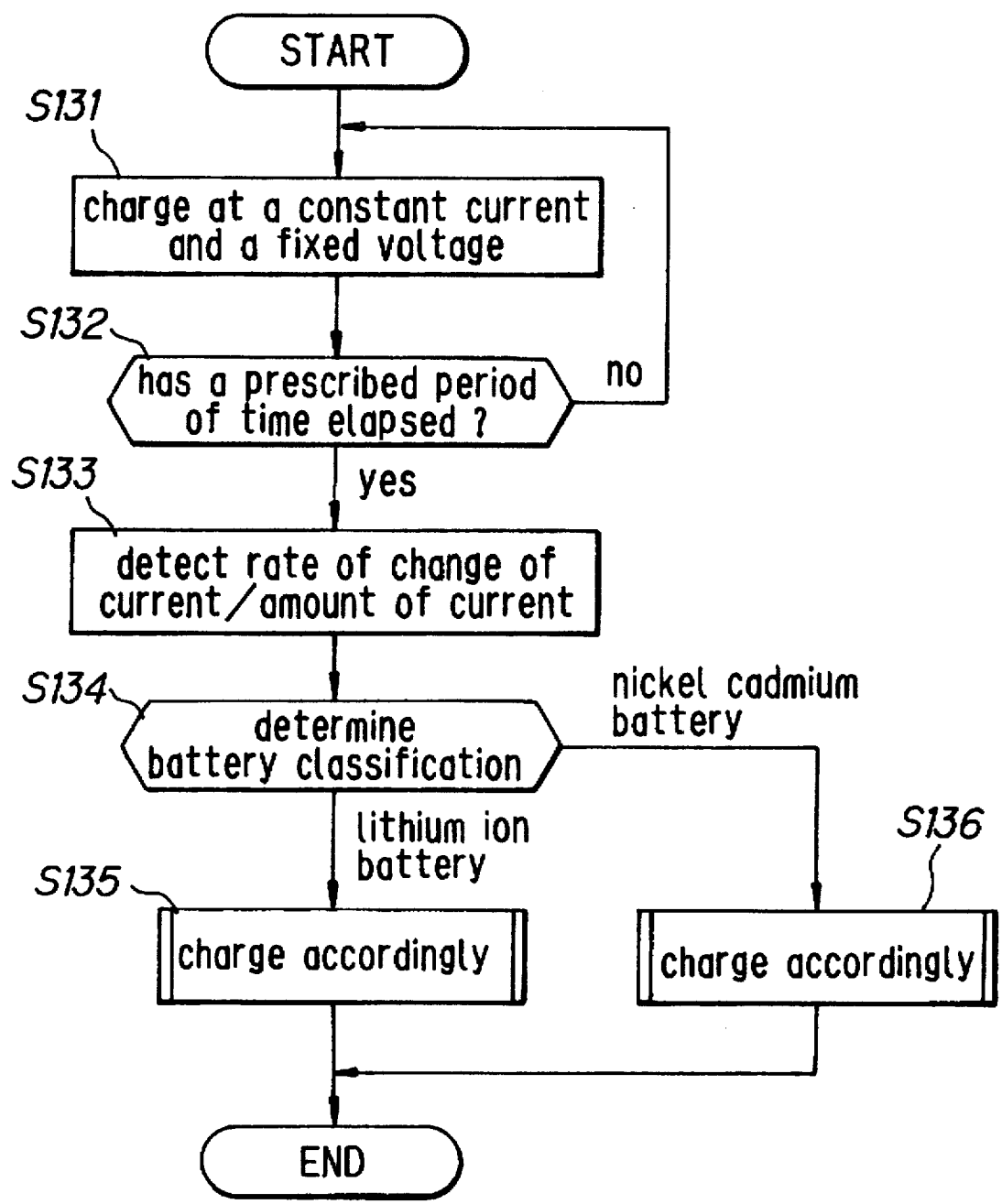
FIG. 25 is a flowchart showing a further battery charging method for the present invention.

With the exclusion of the embodiment in FIG. 11, the charging method is carried out for each of the embodiments in the way shown, for example, in the flowchart in FIG. 25.

First, in step 131, charging is carried out using the constant current circuit 12 and the fixed voltage circuit 13. The charging operation using the constant current circuit 12 and the fixed voltage circuit 13 continues until it is determined from an output from the timer circuit 18 that a predetermined period of time has passed since the commencement of charging. When it is determined that this predetermined period of time has elapsed, the process goes onto step S133 and the charging current value (charging amount) for the battery 1 is detected by the current detection circuit 15. Alternatively, the rate of change of the charging current is detected by the current rate of change detection circuit 51. The process then goes on to step 134 and the battery type is determined in accordance with the detection result from step 133.

Figure 26:
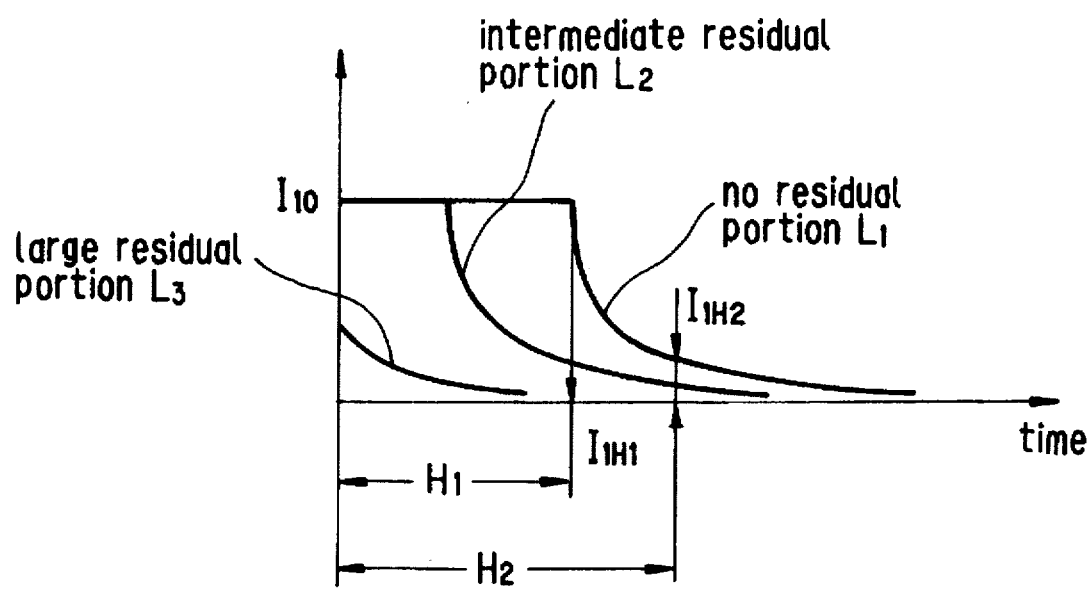
FIG. 26 is a view describing the theory of the battery type determination occurring in step S134 of FIG. 25.
Figure 27:
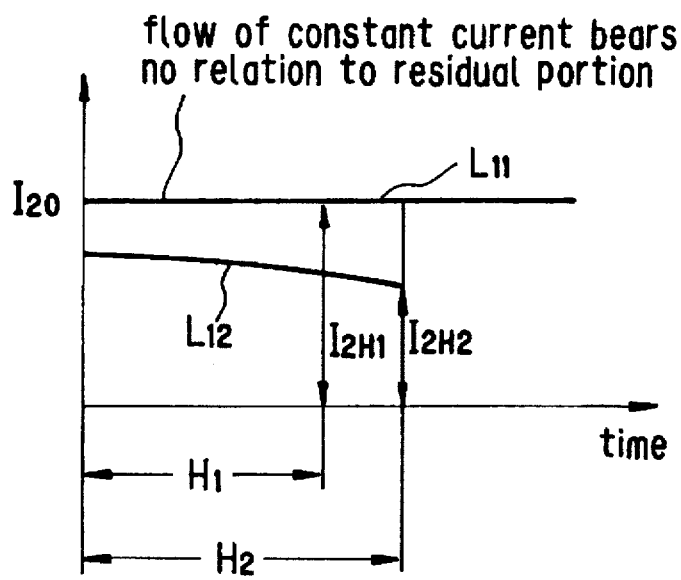
FIG. 27 is a view describing a further theory for the battery type determination occurring in step S134 of FIG. 25.
Figure 28:
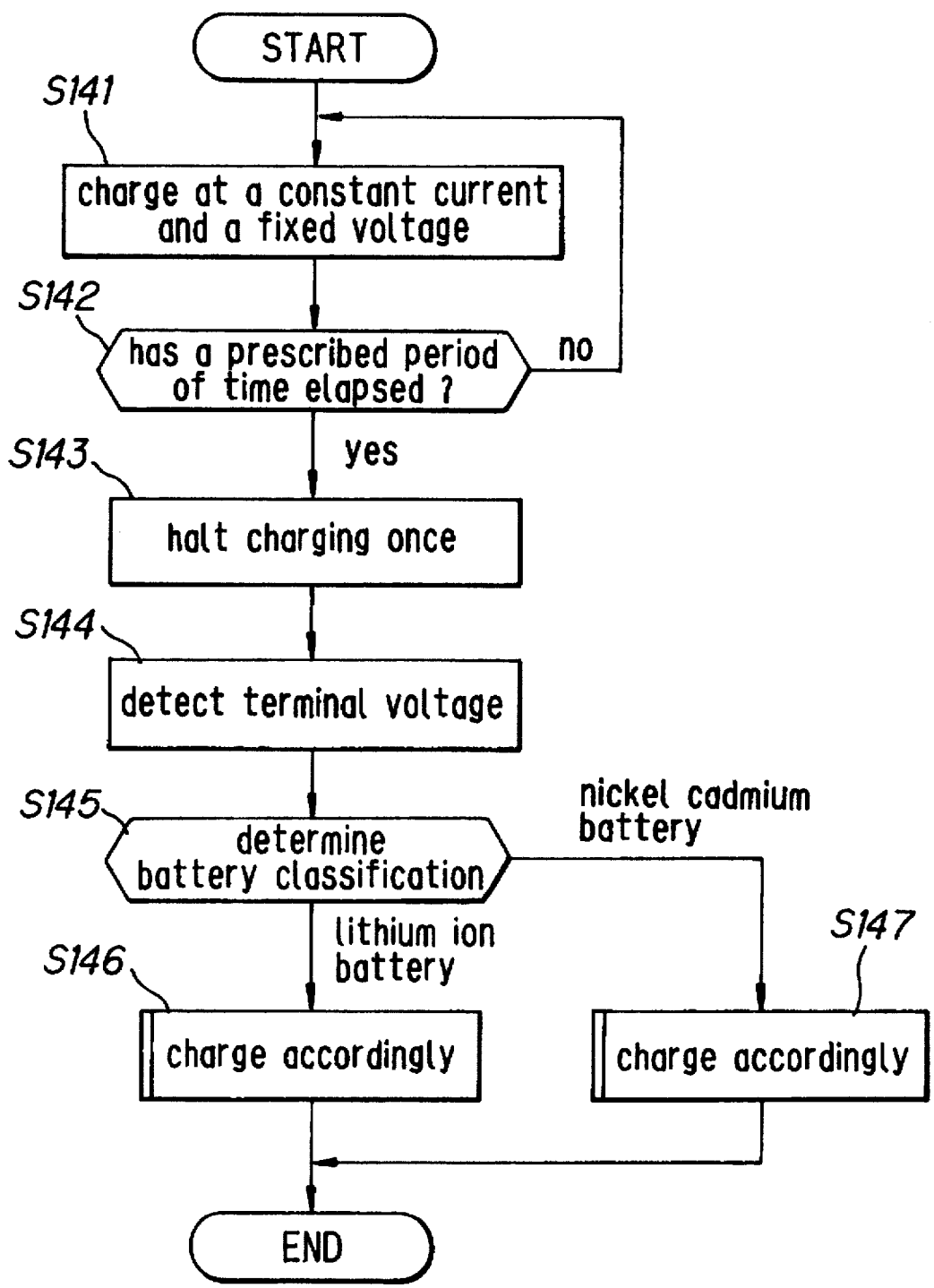
FIG. 28 is a flowchart showing another battery charging method for this invention.

FIG. 26 and FIG. 27 show the theory behind how the battery type is determined from the charging current value. In the case of a lithium battery, as shown in FIG. 26, charging is carried out at a constant current so that when a prescribed period of time has passed, the charging current is sharply reduced. In the case where there is no residual component the charging current flows in the way shown by the curve $L_1$. The value for the current is then $I_{1H2}$ when a period of time $H_2$ has passed.

When a residual component exists at the battery, if the residual amount is large, the charging current becomes smaller more quickly, as shown by the curve $L_2$ or $L_3$. This characteristic is also maintained if the battery becomes degraded.

With regards to this, in the case of a nickel cadmium battery, if the battery is not degraded, a fixed charging current which bears no relation to the residual component will flow in the way shown by the straight line $L_{11}$. If the battery is in any way degraded, the charging current flows in the way shown by the straight line $L_{12}$. i.e. in this case an almost constant current flows but this gets smaller as time passes.

The lithium ion battery charging current $I_{1H1}$ is equal to or smaller than the charging current $I_{2H1}$ for a nickel cadmium battery after a period of time $H_1$ has elapsed since the start of charging. Once a period of time $H_2$ has elapsed, the value of $I_{1H2}$ for the lithium ion type is smaller than the value of $I_{2H2}$ for the nickel cadmium type. The charging current for the battery 1 is therefore compared with a predetermined standard value at a prescribed time between the times $H_1$ and $H_2$ to determine whether the battery is a lithium ion battery or a nickel cadmium battery.

Alternatively, the battery type may be determined from the rate of change of the current, as referred to in the explanation of FIG. 17.

When the battery type is determined in the above way, the process goes on from step 134 to step 135 or step 136 and charging is carried out using a method which corresponds to the type of battery determined to be present.

The timer circuit 18 is utilized and charging is carried out using a method such as, for example, that shown in FIG. 27. i.e. in this embodiment, the constant current circuit 12 and the fixed voltage circuit 13 are used to carry out the charging in step S141. Then, in step 142, it is determined whether or not a predetermined time has elapsed. When the control circuit 17 discerns from the timer circuit 18 that a predetermined period of time has elapsed, step S143 is gone onto, switch 11 is turned off and the charging operation is halted once. Then, in step S144, the terminal voltage for the battery 1 is detected and the battery type is then determined from this detection result in step S145.

Figure 29:
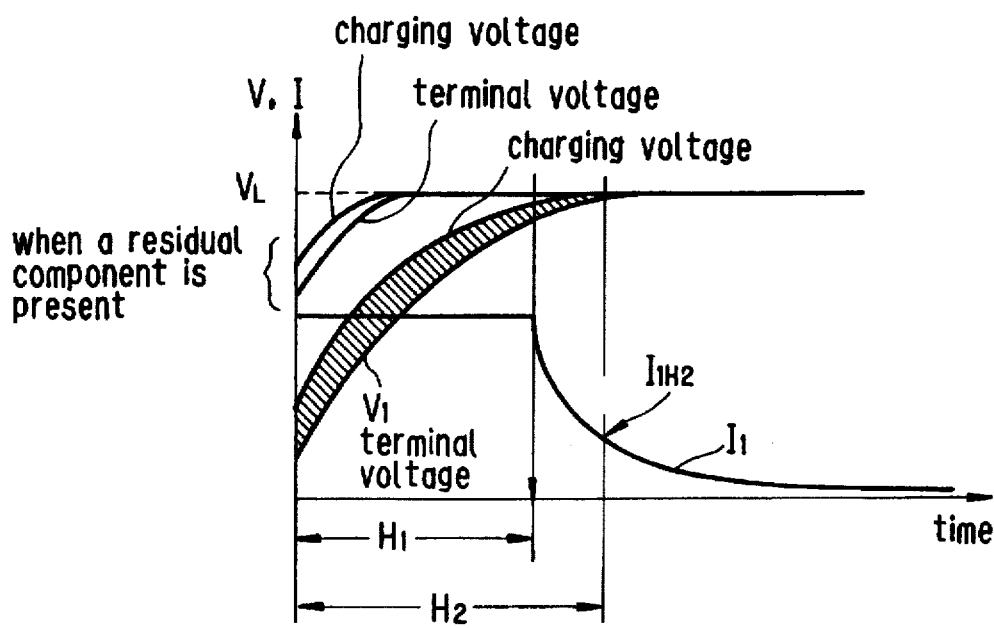
FIG. 29 is a view describing the theory of the battery type determination occurring in step S145 of FIG. 28.

When the item being charged is a lithium ion battery, the terminal voltage $V_1$ for the battery 1L is in the region of the full charging voltage $V_L$ immediately after the charging time has passed, as shown in FIG. 29. As described above, once a period of time $H_1$ has passed since the charging started, the charging is, for all practical purposes, changed over from constant current charging to fixed voltage charging. When this period of time $H_1$ passes, the battery terminal voltage $V_1$ becomes a value which is extremely close to the voltage $V_L$. At the period of time $H_2$ when the charging current becomes the prescribed value $I_{H2}$, the terminal voltage $V_1$ for the battery is almost the same as the full charging voltage $V_L$.

Figure 30:
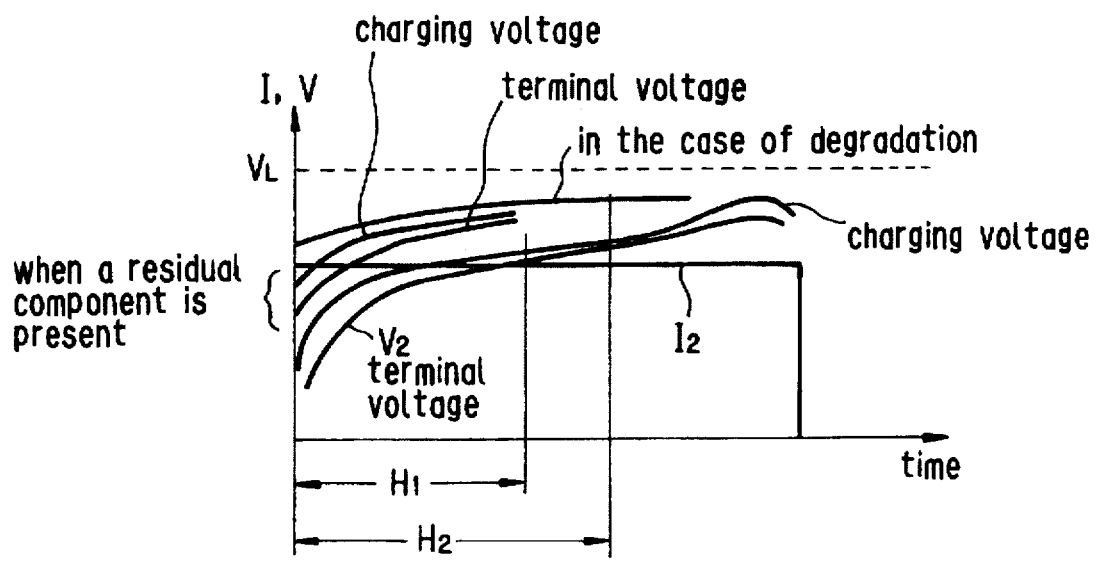
FIG. 30 is a view describing a further theory for the battery type determination occurring in step S145 of FIG. 28.

With regards to this, when the item being charged is a nickel cadmium battery, the terminal voltage $V_2$ for the battery changes as the charging time elapses in the way shown in FIG. 30. i.e. the value for the voltage $V_2$ is smaller than the full charging voltage $V_L$ for the lithium ion battery even if the period of time $H_1$ or the period of time $H_2$ has elapsed.

It therefore follows that a battery can be determined to be a lithium battery by halting the charging once after a period of time $H_1$ or a period of time $H_2$ has elapsed and then detecting the terminal voltage of the battery. If the difference between this voltage and the full charging voltage $V_L$ is then less than a standard value, the battery is a lithium ion battery. It can also be determined that the battery being charged is a nickel cadmium battery if the difference is larger than a standard value.

The battery type may also be determined in accordance with the theory shown in FIG. 7. It is also possible to determine the battery type from the ratio between the charging voltage and the terminal voltage.

When the battery type is determined in step S145 in the above way, step S146 or step S147 is gone onto in accordance with this determination result and the charging is carried out using a method which corresponds to the battery type.

Figure 31:
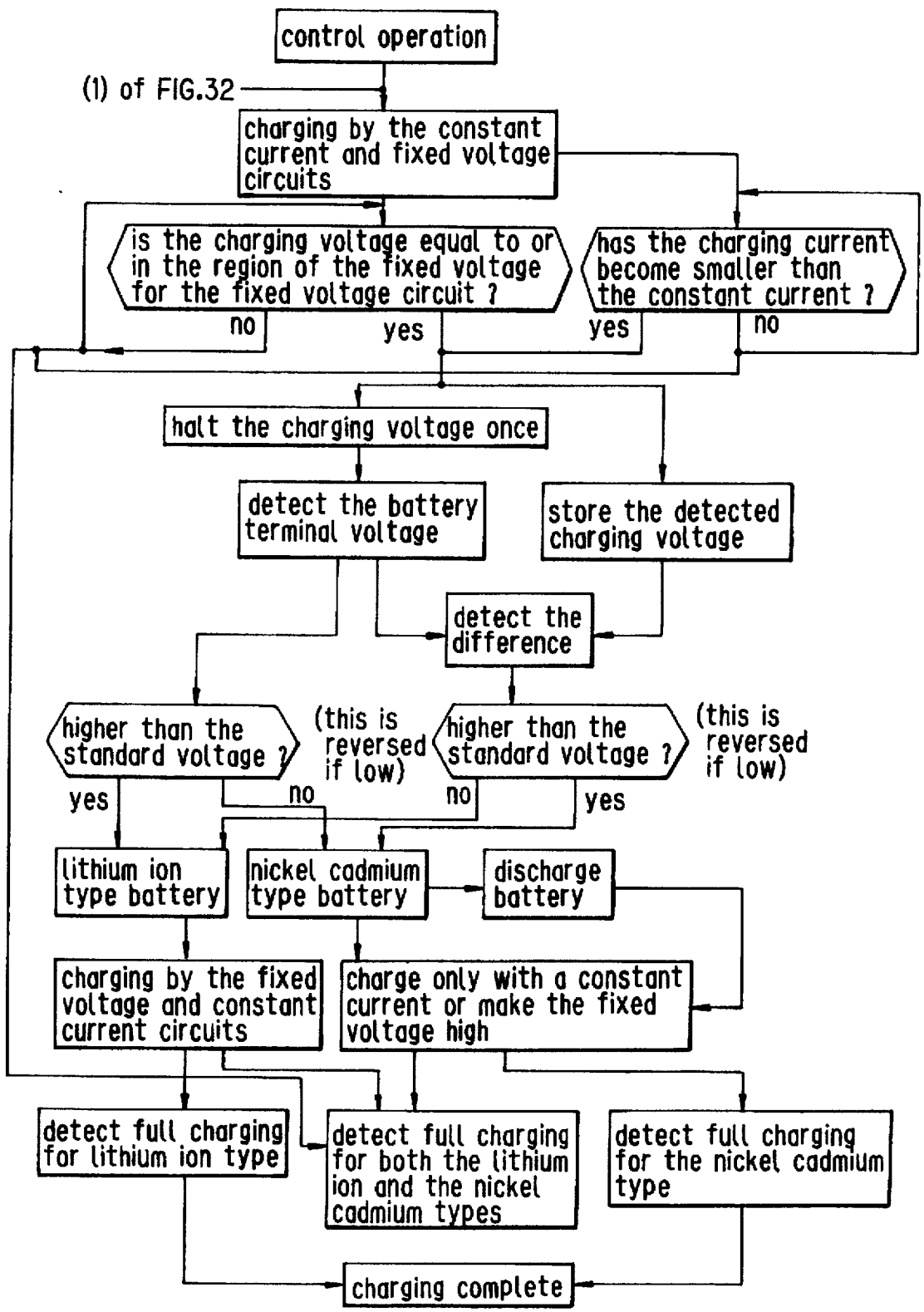
FIG. 31 is a view describing an example combination of the battery charging methods in this invention.
Figure 32:
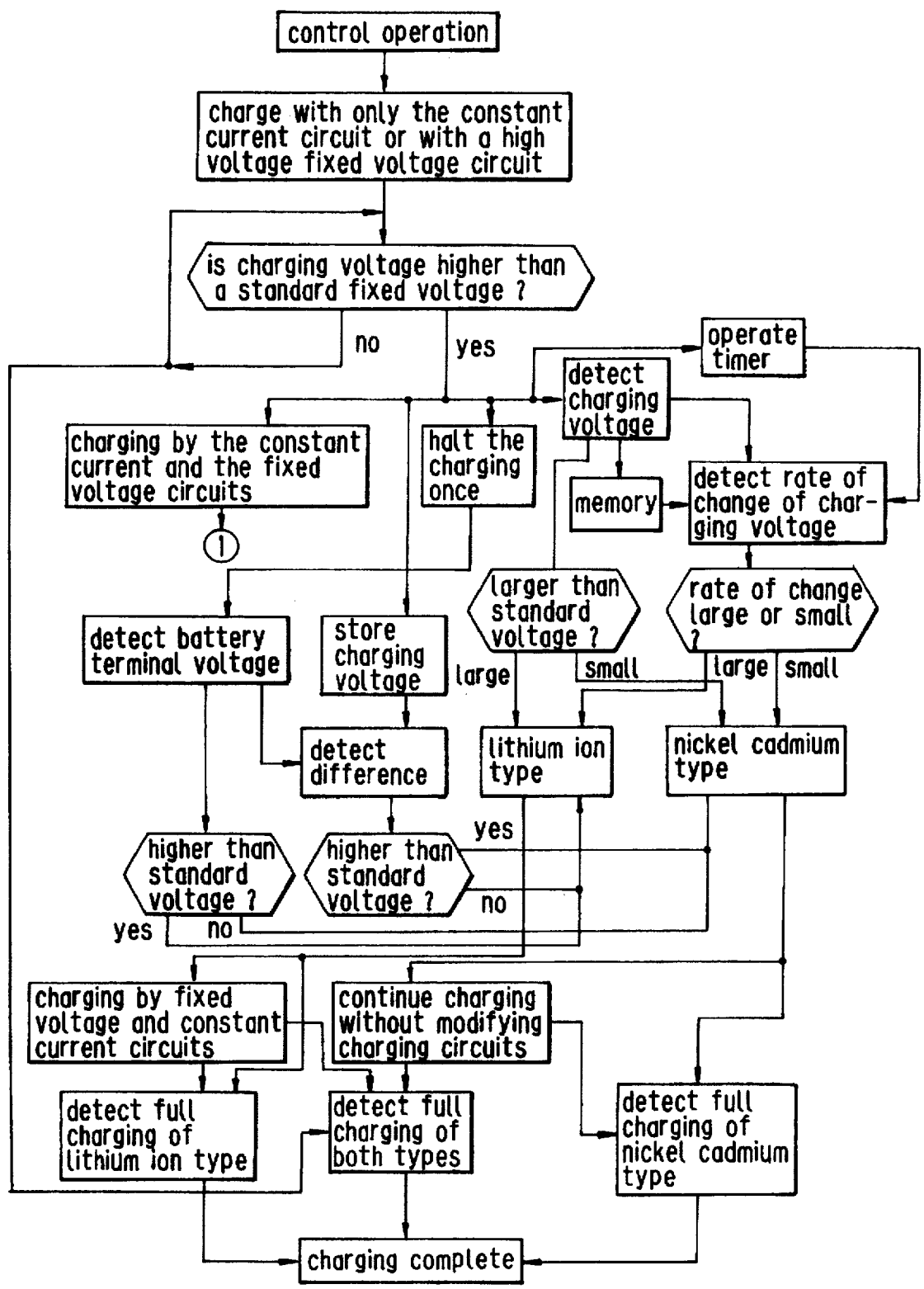
FIG. 32 is a view describing a further example combination of the battery charging methods in this invention.
Figure 33:
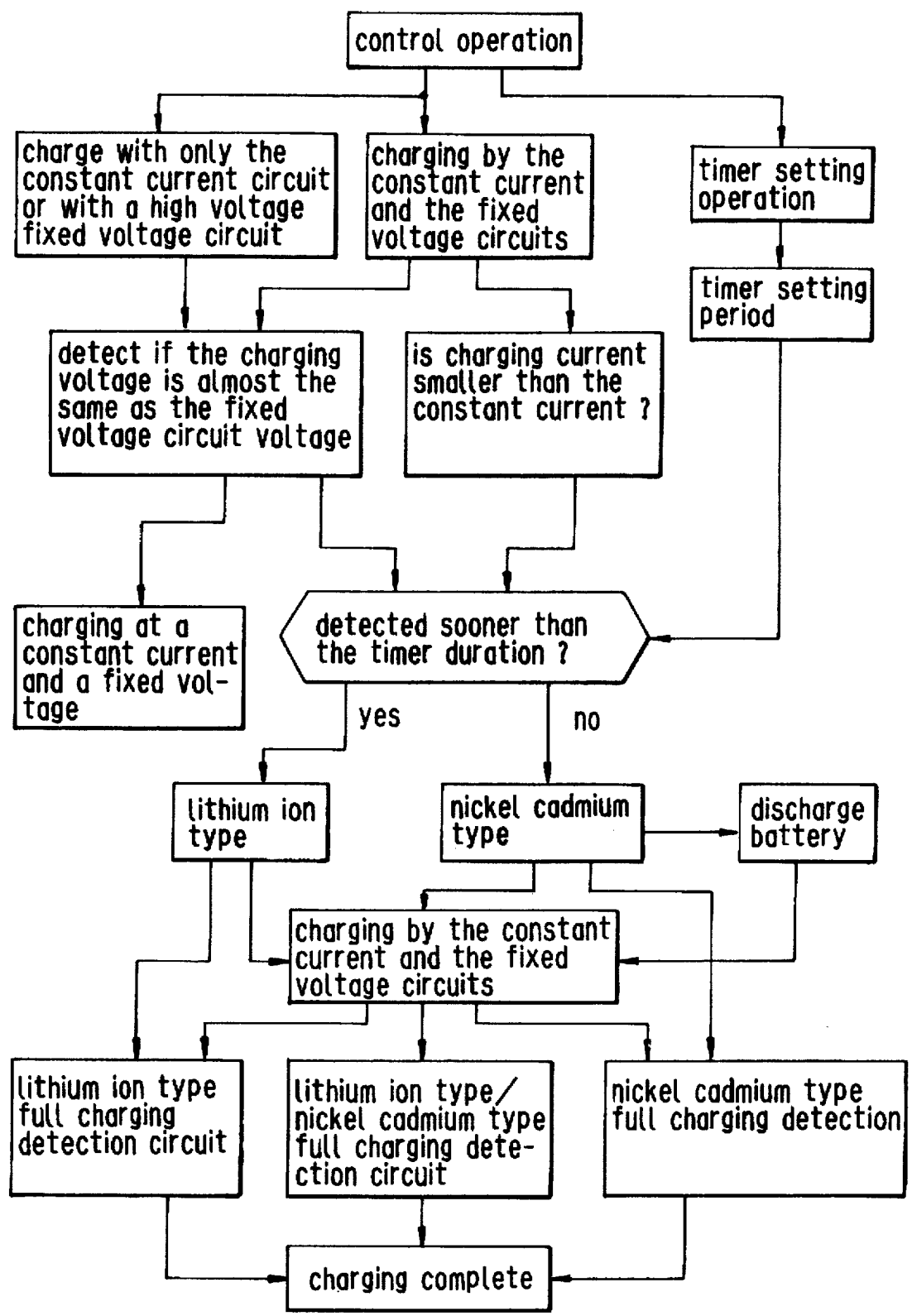
FIG. 33 is a view describing another example combination of the battery charging methods in this invention.

A number of charging methods have been described above but suitable combinations of these methods such as those, for example, shown in FIG. 31 to FIG. 33 are also possible.

It is also possible to take the timing for the charging from, for example, the weak current etc. which comes as self discharging current if the battery is left in the charging equipment for a while after the completion of charging.

Also, when charging is carried out in accordance with the battery type, it is preferable to use a charging method which is appropriate for that type. It is, however, also possible to operate a battery charging method for another type of battery at the same time, as long as it does not substantially hinder this method.

Further, in the aforementioned embodiments charging has been carried out for two types of batteries, lithium ion type batteries and nickel cadmium batteries. The present invention can, however, also be applied to cases for other types of batteries.

According to the battery charging method in the aforementioned present invention, by setting the terminal voltage for a first type of battery at the time of full charging at a value larger than the terminal voltage for a second type of battery at the time of full charging, different types of batteries can be reliably charged in the same charging equipment without damage occurring.

What is claimed is:

1. A battery charging method comprising the steps of:
providing a battery charging circuit to selectively charge a first battery of a first type of battery and a second battery of a second type of battery, charging one of the first or the second batteries by connecting the one battery into the battery charging circuit, and selecting a charging profile for the first and second batteries such that the terminal voltage for the first battery when fully charged is greater than the terminal voltage for the second battery when fully charged.

2. A battery charging method according to claim 1, wherein the step of selecting the first and second batteries is further characterized in that said first type of battery is a lithium ion battery and said second type of battery is a nickel-cadmium battery.

3. A battery charging method according to claims 1 or 2, comprising the further step of detecting the types of the first and second batteries and charging the first battery and the second battery using different methods in accordance with a detection result.

4. A battery charging method according to claim 3, wherein the first and second batteries are charged using a fixed voltage circuit and a constant current circuit and the the first and second batteries are determined using the magnitudes of the terminal voltages after the terminal voltages for the batteries have exceeded a prescribed standard value.

5. A battery charging method according to claim 3, wherein the first and second batteries are charged using a fixed voltage circuit and a constant current circuit and the types of the first and second batteries are determined using the sizes of the terminal currents after the terminal currents for the batteries have fallen below a prescribed standard value.

6. A battery charging method according to claim 3, wherein the first and second batteries are charged for a predetermined period of time by a fixed voltage circuit and a constant current circuit and the types of the first and second batteries are determined by using at least one of the magnitudes of the terminal voltages for the batteries or the magnitudes of the charging currents for the batteries.

7. A battery charging method according to claim 3, wherein the first and second batteries are charged using a constant current circuit and the types of the first and second batteries are determined using the rate of change of the terminal voltages after the terminal voltages for the batteries have exceeded a prescribed standard value.

8. A battery charging method according to claim 3, wherein when said one of said first and second batteries has been determined to be the first battery, charging of the first battery is carried out using a fixed voltage circuit and a constant current circuit, and when said one of said first and second batteries has been determined to be the second battery, charging of the second battery is carried out using a constant current circuit.

9. A battery charging method according to claim 3, wherein full charging of the first battery is detected as a result of the charging current for the first battery having become sufficiently small.

10. A battery charging method according to claim 3, wherein the full charging of the second battery is detected as a result of the terminal voltage for the second battery having fallen.

11. A battery charging method according to claim 3, wherein the full charging of the batteries is detected both as a result of the charging current for the batteries having reduced sufficiently and as a result of the terminal voltages for the batteries having become small.

12. A battery charging method comprising the steps of:
providing a battery charging circuit to provide a charging voltage to selectively charge a first battery of a first type of battery and a second battery of a second type of battery, said second type of battery being a nickel-cadmium battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, wherein detecting the types of the first and second batteries is undertaken by halting the battery charging and detecting whether a drop in the terminal voltage of a fully charged battery occurs corresponding to as nickel-cadmium battery.

13. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, wherein the first battery is a lithium ion battery and the second battery is a nickel-cadmium battery and wherein the charging is carried out using a constant current circuit and a fixed voltage circuit in series, until a charging voltage has reached a predetermined value, halting the charging operation and detecting the terminal voltage of the battery, and comparing the drop in terminal voltage of the one battery to characteristic values to determine battery type of said first and second types.

14. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, said detecting undertaken by charging said one battery with a constant current until a terminal voltage exceeds a preselected voltage and after said preselected voltage value is reached, determining the rate of change of voltage and comparing said rate of change of voltage to characteristic values to determine a battery type of said first and second types.

15. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, said detecting undertaken by charging said one battery with a constant current, until the battery terminal voltage exceeds a preselected voltage value, and then halting the charging operation and detecting the differences between the voltage across the battery directly before the halting and directly after the halting, and using this difference to determine a battery type of said first and second types by comparing to characteristic values.

16. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, said detecting undertaken by charging said one battery using a constant current and fixed voltage circuit in series, detecting the charging current and comparing the charging current to a predetermined current value, and when the charging current is less than the predetermined current value, detecting a current rate of change and determining a battery type of said first and second types by comparing the current rate of change to characteristic values.

17. A battery charging method according to claim 16, wherein before the step of detecting the charging current, detecting said terminal voltage of said battery and if said terminal voltage is greater than a preselected voltage value, charging said battery at a constant current and a fixed voltage.

18. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, wherein said detecting is undertaken by charging said one battery using a constant current circuit and a fixed voltage circuit in series, detecting the charging current during this charging, until the charging current is less than a preselected current value, bypassing the fixed voltage circuit and charging using only the constant current from the constant current circuit, detecting the charging voltage and when said charging voltage exceeds a preselected voltage value, detecting a rate of change of the terminal voltage of said battery and determining a battery type of said first and second types by comparing the rate of charge to the terminal voltage of said battery to characteristic values.

19. A battery charging method according to claim 1, wherein said second type of battery is a nickel-cadmium battery and comprising the further steps of providing a discharge circuit connected in parallel with said battery in said charging circuit, and when said detecting determines that said one battery is a nickel-cadmium battery, said charging is halted and said one battery is discharged through said discharge circuit once and then said charging is resumed with said discharge circuit disconnected.

20. A battery charging method according to claim 1, comprising the further steps of providing a temperature detection circuit, and when the temperature detected by the temperature detection circuit is lower than a preselected value, disabling said charging circuit.

21. A battery charging method according to claim 1, comprising the further steps of providing a temperature detection circuit connected to said charging circuit, and when the temperature measured by said temperature detection circuit is lower than a preselected value, charging said battery with a constant current circuit and a fixed voltage circuit in series.

22. A battery charging method according to claim 21, comprising the further steps of providing a heater drive circuit and a heater, driving said heat drive circuit to raise the temperature of said battery to above said preselected value before charging.

23. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, wherein said detecting is undertaken by charging said one battery at a constant current and a fixed voltage, timing the charging period, and after a prescribed period of time has elapsed detecting the rate of change of the current charging said one battery and determining a battery type of said first end second types of said two types from this rate of change of current by comparing with characteristic values.

24. A battery charging method comprising the steps of:
providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, wherein said detecting is undertaken by charging said one battery at a constant current and a fixed voltage, timing the charging period, and after a prescribed period of time has elapsed detecting the amount of the current charging said one battery and determining a battery type from this amount of currents by comparing with characteristic values.

25. A battery charging method comprising the steps of:

providing a battery charging circuit to provide a charging voltage to selectively charge a first battery of a first type of battery and a second battery of a second type of battery, charging one of the first or the second batteries by connecting the one battery into the battery charging circuit, and selecting charging profiles for the first and second batteries such that a terminal voltage for the first battery when fully charged is greater than a terminal voltage for the second battery when fully charged, detecting the types of the first and second batteries and charging the first battery and the second battery using different methods in accordance with a detection result, wherein said detecting is undertaken by charging said one battery at a constant current and a fixed voltage in series timing said charging and after a prescribed period of time has elapsed halting the charging, detecting the terminal voltage of the battery and determining a battery type of said first and second types from the detected terminal voltage by comparing to characteristic values.

* * * * *